United States Patent
Ishii et al.

(10) Patent No.: US 8,031,648 B2
(45) Date of Patent: Oct. 4, 2011

(54) PACKET TRANSMISSION CONTROL DEVICE AND PACKET TRANSMISSION CONTROL METHOD

(75) Inventors: Hiroyuki Ishii, Yokosuka (JP); Akihito Hanaki, Yokohama (JP); Masafumi Usuda, Tokyo (JP)

(73) Assignee: NTT DoCoMo, Inc., Tokyo (JP)

( * ) Notice: Subject to any disclaimer, the term of this patent is extended or adjusted under 35 U.S.C. 154(b) by 872 days.

(21) Appl. No.: 11/577,268

(22) PCT Filed: Oct. 17, 2005

(86) PCT No.: PCT/JP2005/019020
§ 371 (c)(1),
(2), (4) Date: Jul. 25, 2007

(87) PCT Pub. No.: WO2006/041182
PCT Pub. Date: Apr. 20, 2006

(65) Prior Publication Data
US 2008/0043657 A1    Feb. 21, 2008

(30) Foreign Application Priority Data

Oct. 15, 2004    (JP) .............................. P2004-302287

(51) Int. Cl.
G08C 17/00    (2006.01)
H04W 52/00    (2009.01)
H04W 52/34    (2009.01)
H04W 52/30    (2009.01)

(52) U.S. Cl. ...................... 370/311; 455/522; 455/67.11
(58) Field of Classification Search .................. 455/522, 455/423–425, 67.11, 418–420; 370/311
See application file for complete search history.

(56) References Cited

U.S. PATENT DOCUMENTS

| 6,385,462 | B1 * | 5/2002 | Baum et al. .................. 455/522 |
| 7,411,901 | B1 * | 8/2008 | Alexander et al. ............ 370/230 |
| 2002/0173312 | A1 * | 11/2002 | Takano et al. ................. 455/452 |
| 2005/0143084 | A1 * | 6/2005 | Cheng et al. ............... 455/452.2 |

FOREIGN PATENT DOCUMENTS

EP    1 422 898    5/2004
(Continued)

OTHER PUBLICATIONS

3GPP TS 25.214 V5.9.0, 3rd Generation Partnership Project; Technical Specification Group Radio Access Network: Physical Layer Procedures (FDD), (Release 5), Jun. 2004.
3GPP TR 25.848 V4.0.0, 3rd Generation Partnership Project; Technical Specification Group Radio Access Network; Physical Layer Aspects of Ultra High Speed Downlink Packet Access, (Release 4), Mar. 2001.

(Continued)

Primary Examiner — Matthew Sams
(74) Attorney, Agent, or Firm — Oblon, Spivak, McClelland, Maier & Neustadt, L.L.P.

(57) ABSTRACT

A packet transmission control device relating to the present invention includes: a storage unit configured to store a transmission resource available for use in the packet transmission, radio quality information on the downlink, and a transmission method to be used in the packet transmission while associating them with one another; a determination unit configured to determine a transmission method to be used in the packet transmission on the basis of the radio quality information, on the downlink reported from the mobile stations and the transmission resource available for use in the packet transmission, by referring to the storage unit; and a packet transmission unit configured to transmit the packet by using the determined transmission method.

21 Claims, 9 Drawing Sheets

FOREIGN PATENT DOCUMENTS

| | | |
|---|---|---|
| JP | 2004-173017 | 6/2004 |
| JP | 2004 173019 | 6/2004 |
| JP | 2004173019 A * | 6/2004 |
| JP | 2004 193761 | 7/2004 |
| WO | 03 001681 | 1/2003 |
| WO | WO 03/021903 A1 | 3/2003 |

OTHER PUBLICATIONS

3GPP2 C. S0024, "CDMA2000 High Rate Packet Data Air Interface Specification", 3G, $3^{rd}$ Generation Partnership Project 2, "3GPP2". 2000.

U.S. Appl. No. 11/577,263, filed Apr. 13, 2007, Ishii, et al.

* cited by examiner

FIG. 6A

| CQI | TRANSPORT BLOCK SIZE | CODE RESOURCE AMOUNT | MODULATION SCHEME | OFFSET VALUE OF POWER RESOURCE AMOUNT |
|---|---|---|---|---|
| 1 | 137 | 1 | QPSK | 0 |
| 2 | 173 | 1 | QPSK | 0 |
| 3 | 233 | 1 | QPSK | 0 |
| 4 | 317 | 1 | QPSK | 0 |
| 5 | 377 | 1 | QPSK | 0 |
| 6 | 461 | 1 | QPSK | 0 |
| 7 | 650 | 2 | QPSK | 0 |
| 8 | 792 | 2 | QPSK | 0 |
| 9 | 1036 | 3 | QPSK | 0 |
| 10 | 1356 | 4 | QPSK | 0 |
| 11 | 1621 | 4 | QPSK | 0 |
| 12 | 1939 | 4 | QPSK | 0 |
| 13 | 2279 | 4 | QPSK | 0 |
| 14 | 2583 | 4 | QPSK | 0 |
| 15 | 2876 | 4 | 16QAM | 0 |
| 16 | 3319 | 4 | 16QAM | 0 |
| 17 | 3830 | 4 | 16QAM | 0 |
| 18 | 4265 | 4 | 16QAM | 0 |
| 19 | 4748 | 4 | 16QAM | 0 |
| 20 | 5193 | 4 | 16QAM | 0 |
| 21 | 5680 | 4 | 16QAM | 0 |
| 22 | 5680 | 4 | 16QAM | -1 |
| 23 | 5680 | 4 | 16QAM | -2 |
| 24 | 5680 | 4 | 16QAM | -3 |
| 25 | 5680 | 4 | 16QAM | -4 |
| 26 | 5680 | 4 | 16QAM | -5 |
| 27 | 5680 | 4 | 16QAM | -6 |
| 28 | 5680 | 4 | 16QAM | -7 |
| 29 | 5680 | 4 | 16QAM | -8 |
| 30 | 5680 | 4 | 16QAM | -9 |

FIG. 6B

| CQI | TRANSPORT BLOCK SIZE | CODE RESOURCE AMOUNT | MODULATION SCHEME | OFFSET VALUE OF POWER RESOURCE AMOUNT |
|---|---|---|---|---|
| 1 | 137 | 1 | QPSK | 0 |
| 2 | 173 | 1 | QPSK | 0 |
| 3 | 233 | 1 | QPSK | 0 |
| 4 | 317 | 1 | QPSK | 0 |
| 5 | 377 | 1 | QPSK | 0 |
| 6 | 461 | 1 | QPSK | 0 |
| 7 | 650 | 2 | QPSK | 0 |
| 8 | 792 | 2 | QPSK | 0 |
| 9 | 1036 | 3 | QPSK | 0 |
| 10 | 1356 | 4 | QPSK | 0 |
| 11 | 1681 | 5 | QPSK | 0 |
| 12 | 2046 | 5 | QPSK | 0 |
| 13 | 2404 | 5 | QPSK | 0 |
| 14 | 2876 | 5 | QPSK | 0 |
| 15 | 3260 | 5 | QPSK | 0 |
| 16 | 3630 | 5 | 16QAM | 0 |
| 17 | 4189 | 5 | 16QAM | 0 |
| 18 | 4664 | 5 | 16QAM | 0 |
| 19 | 5287 | 5 | 16QAM | 0 |
| 20 | 5887 | 5 | 16QAM | 0 |
| 21 | 6554 | 5 | 16QAM | 0 |
| 22 | 7168 | 5 | 16QAM | 0 |
| 23 | 7168 | 5 | 16QAM | -1 |
| 24 | 7168 | 5 | 16QAM | -2 |
| 25 | 7168 | 5 | 16QAM | -3 |
| 26 | 7168 | 5 | 16QAM | -4 |
| 27 | 7168 | 5 | 16QAM | -5 |
| 28 | 7168 | 5 | 16QAM | -6 |
| 29 | 7168 | 5 | 16QAM | -7 |
| 30 | 7168 | 5 | 16QAM | -8 |

FIG. 10A

| CQ1 | TRANSPORT BLOCK SIZE | CODE RESOURCE AMOUNT | MODULATION SCHEME | OFFSET VALUE OF POWER RESOURCE AMOUNT |
|---|---|---|---|---|
| 1 | 137 | 1 | QPSK | 0 |
| 2 | 173 | 1 | QPSK | 0 |
| 3 | 233 | 1 | QPSK | 0 |
| 4 | 317 | 1 | QPSK | 0 |
| 5 | 377 | 1 | QPSK | 0 |
| 6 | 461 | 1 | QPSK | 0 |
| 7 | 650 | 2 | QPSK | 0 |
| 8 | 792 | 2 | QPSK | 0 |
| 9 | 1036 | 3 | QPSK | 0 |
| 10 | 1356 | 4 | QPSK | 0 |
| 11 | 1621 | 4 | QPSK | 0 |
| 12 | 1939 | 4 | QPSK | 0 |
| 13 | 2279 | 4 | QPSK | 0 |
| 14 | 2583 | 4 | QPSK | 0 |
| 15 | 2876 | 4 | 16QAM | 0 |
| 16 | 3319 | 4 | 16QAM | 0 |
| 17 | 3830 | 4 | 16QAM | 0 |
| 18 | 4265 | 4 | 16QAM | 0 |
| 19 | 4748 | 4 | 16QAM | 0 |
| 20 | 5193 | 4 | 16QAM | 0 |
| 21 | 5680 | 4 | 16QAM | 0 |
| 22 | 5680 | 4 | 16QAM | -0.7 |
| 23 | 5680 | 4 | 16QAM | -1.4 |
| 24 | 5680 | 4 | 16QAM | -2.1 |
| 25 | 5680 | 4 | 16QAM | -2.8 |
| 26 | 5680 | 4 | 16QAM | -3.5 |
| 27 | 5680 | 4 | 16QAM | -4.2 |
| 28 | 5680 | 4 | 16QAM | -4.9 |
| 29 | 5680 | 4 | 16QAM | -5.6 |
| 30 | 5680 | 4 | 16QAM | -6.3 |

FIG. 10B

| CQ1 | TRANSPORT BLOCK SIZE | CODE RESOURCE AMOUNT | MODULATION SCHEME | OFFSET VALUE OF POWER RESOURCE AMOUNT |
|---|---|---|---|---|
| 1 | 137 | 1 | QPSK | 0 |
| 2 | 173 | 1 | QPSK | 0 |
| 3 | 233 | 1 | QPSK | 0 |
| 4 | 317 | 1 | QPSK | 0 |
| 5 | 377 | 1 | QPSK | 0 |
| 6 | 461 | 1 | QPSK | 0 |
| 7 | 650 | 2 | QPSK | 0 |
| 8 | 792 | 2 | QPSK | 0 |
| 9 | 1036 | 3 | QPSK | 0 |
| 10 | 1356 | 4 | QPSK | 0 |
| 11 | 1681 | 5 | QPSK | 0 |
| 12 | 2046 | 5 | QPSK | 0 |
| 13 | 2404 | 5 | QPSK | 0 |
| 14 | 2876 | 5 | QPSK | 0 |
| 15 | 3260 | 5 | QPSK | 0 |
| 16 | 3630 | 5 | 16QAM | 0 |
| 17 | 4189 | 5 | 16QAM | 0 |
| 18 | 4664 | 5 | 16QAM | 0 |
| 19 | 5287 | 5 | 16QAM | 0 |
| 20 | 5887 | 5 | 16QAM | 0 |
| 21 | 6554 | 5 | 16QAM | 0 |
| 22 | 7168 | 5 | 16QAM | 0 |
| 23 | 7168 | 5 | 16QAM | -0.7 |
| 24 | 7168 | 5 | 16QAM | -1.4 |
| 25 | 7168 | 5 | 16QAM | -2.1 |
| 26 | 7168 | 5 | 16QAM | -2.8 |
| 27 | 7168 | 5 | 16QAM | -3.5 |
| 28 | 7168 | 5 | 16QAM | -4.2 |
| 29 | 7168 | 5 | 16QAM | -4.9 |
| 30 | 7168 | 5 | 16QAM | -5.6 |

PACKET TRANSMISSION CONTROL DEVICE AND PACKET TRANSMISSION CONTROL METHOD

TECHNICAL FIELD

The present invention relates to a packet transmission control device and a packet transmission control method, which control a downlink packet transmission to a plurality of mobile stations.

BACKGROUND ART

Heretofore, a mobile communications system, which controls a downlink packet transmission, by adaptively changing a downlink packet transmission method (for example, such as a transmission format of a modulation scheme, a coding rate, or the like) in accordance with a downlink radio condition when a radio base station performs communications with mobile stations belonging to the radio base station. Such a control system is called an "AMC (Adaptive Modulation and Coding)" system.

In a mobile communications system to which such an AMC system is applied, a mobile station is configured to monitor downlink radio conditions, and to notify the radio base station of the monitored downlink radio conditions by using an uplink. Here, the downlink radio conditions include an SIR, a CIR, a received power, and the like.

Furthermore, the radio base station is configured to determine a downlink transmission method (for example, such as a transmission format of a modulation scheme, a coding rate, or the like) on the basis of the downlink radio conditions notified by the mobile station, and a transmission resource (a radio resource) available for the downlink packet transmission, and then to perform the downlink packet transmission with the determined transmission method.

At this time, in a case where the communications between the radio base station and the mobile station can be performed according to the downlink radio conditions, that is, in a case where the downlink radio conditions are good as in such a case where the mobile station is located near the radio base station, and a case where the moving speed of the mobile station is low, the mobile communications system to which the AMC system is applied is configured to perform the downlink packet transmission by use of a transmission method capable of performing communications at a higher transmission rate.

On the other hand, in a case where the downlink radio condition is poor as in such a case where the mobile station is located at the edge of the cell, and a case where the moving speed of the mobile station is high, the mobile communications system to which the AMC system is applied is configured to perform the downlink packet transmission by use of a transmission method capable of performing communications at a lower transmission rate.

Thus, the mobile communications system to which the AMC system is applied becomes capable of performing efficient communications in accordance with a change in a propagation environment.

Incidentally, as to the standardization of the Third Generation Mobile communications system, so called "IMT-2000" in the 3GPP/3GPP2 (Third-Generation Partnership Project/Third-Generation Partnership Project 2) organized by a regional standardization organization, or the like, the groundwork is laid for the standard specification for "W-CDMA system" in the former, and the groundwork is laid for the standard specification for "cdma2000 system" in the later.

In the 3GPP, on the basis of a prediction that high speed and large capacity traffic by downloading from a data base or a Web site specifically in downlink increases accompanying by the rapid widespread of the internet in recent years, the standardization of the "HSDPA (High Speed Downlink Packet Access) system", which is a downlink high speed packet transmission system, has been in process.

Furthermore, also in the 3GPP2, from a viewpoint similar to the aforementioned one, the standardization of a downlink high-speed packet transmission system, "1x-EV DO" has been in process. Note that "DO" means "Data Only"" in the "1x-EV DO" of the cdma2000 system.

For example, in the HSDPA system, in accordance with the radio conditions between a mobile station and the radio base station, the AMC system which controls the modulation scheme or the coding rate of a radio channel is used. Here, the mobile station is configured to notify the radio base station of the downlink radio condition, by transmitting control information (radio condition information) called, CQI (Channel Quality Indicator) through the uplink. Note that the CQI is subjected to mapping with an uplink HS-DPCCH (High Speed-Dedicated Physical Control Channel) for the HSDPA.

Moreover, the mobile station is configured to calculate the aforementioned CQI on the basis of an SIR found from a downlink common pilot channel (CPICH: Common Pilot Channel). For example, the mobile station is configured to calculate the CQI so that the error rate of the received packet becomes 10%.

On the other hand, the radio base station determines, by use of the CQI and a downlink radio resource (that is, a power resource and a code resource), a transmission method (specifically, a transmission format or a transmission resource such as a modulation scheme, an amount of a code resource, a transport block size (TBS), or an offset value for an amount of a power resource), the method being used in the downlink packet transmission, and then, performs the downlink packet transmission by use of such a transmission method.

Furthermore, in the HSDPA system, the radio base station and a mobile station performs retransmission control, which is called H-ARQ control, at the same time. The mobile station receives a downlink packet, causes the decoding result (OK or NG) of the received packet to be subjected to mapping with an HS-DPCCH, and transmits it through the uplink as acknowledgement information regarding the downlink. On the other hand, the radio base station performs retransmission control by the H-ARQ control on the basis of the acknowledgement information.

Here, as the acknowledgement information regarding the downlink, there is Ack/Nack/DTX. The "Ack" is an affirmative response (OK) indicating that the receiving of a packet has been successful. The "Neck" is a negative response (NG) indicating that the receiving of a packet has failed. The "DTX" indicates that the mobile station has failed to receive downlink shared control information HS-SCCH in the downward direction for some reason, and has not received the downlink packet.

However, in the conventional mobile communications system, there has been a problem that it is difficult to control the trade-off relationship between reduction in a transmission resource used in a packet transmission and deterioration of an error rate.

Moreover, in the conventional mobile communications system, there has been a problem that a transmission resource (a radio resource such as a code resource or a power resource) is unnecessarily consumed since the transmission method used in a downlink packet transmission is not determined on the basis of the difference between a radio channel quality at the time of a retransmission by the H-ARQ control and a radio channel quality at the time of a initial transmission, or of the amount of data of the packet to be transmitted.

DISCLOSURE OF THE INVENTION

Accordingly, the present invention has been made with the foregoing points taken into consideration. An object of the present invention is to provide a packet transmission control device and a packet transmission control method, which are capable of efficiently using a transmission resource while controlling deterioration of a packet error rate.

Furthermore, an object of the present invention is to provide a packet transmission control device and a packet transmission control method, which are capable of performing a packet transmission by efficiently using a transmission resource by determining a transmission method to be used in downlink packet transmission on the basis of the difference between the radio channel quality at the time of a retransmission by an H-ARQ control and the radio channel quality at the time of the initial transmission, and of an amount of data of the packet to be transmitted.

A first aspect of the present invention is summarized as a packet transmission control device which controls a packet transmission of a downlink to a plurality of mobile stations, the packet transmission control device including: a storage unit configured to store a transmission resource available for use in the packet transmission, radio quality information on the downlink, and a transmission method to be used in the packet transmission while associating them with one another; a determination unit configured to determine a transmission method to be used in the packet transmission on the basis of the radio quality information, on the downlink reported from the mobile stations and the transmission resource available for use in the packet transmission, by referring to the storage unit; and a packet transmission unit configured to transmit the packet by using the determined transmission method.

In the first aspect of the present invention, the storage unit can be configured to store a transport block size to be used in the packet transmission as the transmission method, and when the radio quality information on the downlink and a code resource available for use in the packet transmission are fixed, the transport block size can be set so as to fulfill a predetermined packet error rate, and to become the maximum value in the storage unit.

In the first aspect of the present invention, the storage unit can be configure to store, as the transmission method, a transport block size to be used in the packet transmission, a modulation scheme to be used in the packet transmission, an amount of code resources to be used in the packet transmission, and an amount of power resources to be used in the packet transmission.

In the first aspect of the present invention, when a data amount of packets to be transmitted is smaller than a transport block size determined as the transmission method, the determination unit can be configured to reduce the amount of power resources determined as the transmission method.

In the first aspect of the present invention, the determination unit can be configured to determine the amount of power resources to be reduced, in accordance with "(the amount of power resources to be reduced)={(the radio quality information corresponding to the transport block size determined as the transmission method)−(radio quality information corresponding to the data amount of packets to be transmitted)}×(an arbitrary coefficient)". Here, the arbitrary coefficient can be less than 1. In the first aspect of the present invention, when the amount of power resources is reduced, and when the amount of power resources to be used in the packet transmission is smaller than a predetermined lower limit value, the determination unit can be configured to determine the predetermined lower limit value as the amount of power resources to be used in the packet transmission.

In the first aspect of the present invention, when a transport block size determined as the transmission method is smaller than the minimum data transmission unit, the determination unit can be configured to cancel transmission of the packet of the downlink to the mobile station, and to transmit the packet of the downlink to another mobile station.

In the first aspect of the present invention, when a transport block size determined as the transmission method is smaller than the minimum data transmission unit, the determination unit can be configured to determine the transmission method so that the packet can be transmitted in the minimum data transmission unit.

In the first aspect of the present invention, the determination unit can be configured to determine the transmission method, so that the transmission resource available for use in the packet transmission can be equally allocated to the plurality of mobile stations at a single transmission timing.

In the first aspect of the present invention, when determining a transmission method of a mobile station to which the packet is transmitted, the determination unit can be configured to determine the transmission method by setting N for the number of mobile stations to which the packet is transmitted in addition to the mobile station, by changing the radio quality information on the downlink to "(the radio quality information on the downlink)−$10\times\log_{10}N$", and by reducing the amount of power resources determined as the transmission method by the amount equivalent to "$10\times\log_{10}N$".

In the first aspect of the present invention, the determination unit can be configured to reduce the amount of power resources determined as the transmission method, when the packet which has been previously transmitted is to be retransmitted, and when the determination unit judges that the current radio condition is better than a radio condition at the time when the packet has been previously transmitted, on the basis of the previous radio quality information on the downlink, the current radio quality information on the downlink, the transmission resource available for use in the previous packet transmission, and a transmission resource available for use in the current packet transmission.

In the first aspect of the present invention, the determination unit can configured to determine the amount of power resources to be reduced in accordance with "(the amount of power resources to be reduced)={(the current radio quality information on the downlink)−(the previous radio quality information on the downlink)}×(an arbitrary coefficient)+((the power resource available for use in the current packet transmission)−(the power resource available for use in the previous packet transmission))×(an arbitrary coefficient)". Here, the arbitrary coefficient can be less than 1.

In the first aspect of the present invention, when the amount of power resources is reduced, and when the amount of power resources to be used in the packet transmission is smaller than a predetermined lower limit value, the determination unit can be configured to determine the predetermined lower limit value as the amount of power resources to be used in the packet transmission.

In the first aspect of the present invention, the determination unit can be configured to determine the transmission method so that the transmission resource available for use in the packet transmission can be used to the fullest extent, when the packet which has been previously transmitted is to be retransmitted, and when the determination unit judges that the current radio condition is not better than the radio condition when the packet has been previously transmitted, on the basis of the previous radio quality information on the downlink, the current radio quality information on the downlink, the transmission resource available for use in the previous packet transmission, and a transmission resource available for use in the current packet transmission.

In the first aspect of the present invention, when a modulation scheme determined as the transmission method at the time of the previous packet transmission is 16QAM, and when a coding rate becomes smaller than a predetermined value when the modulation scheme is changed to QPSK, the determination unit can be configured to determine the transmission method so that the transmission resource available for use in the packet transmission can be used to the fullest extent, by changing the modulation scheme to be used in the packet transmission to QPSK.

In the first aspect of the present invention, the determination unit can be configured to determine the transmission method so that the transmission resource available for use in the packet transmission can be used to the fullest extent, by increasing the amount of code resources to be used in the packet transmission within a range that keeps the coding rate equal to or greater than 1/3.

In the first aspect of the present invention, when the radio quality information on the downlink reported from the mobile station is larger than a predetermined upper limit value of the radio quality information, the determination unit can be configured to determine the transmission method, by changing the radio quality information on the downlink reported from the mobile station to the predetermined upper limit value of the radio quality information.

In the first aspect of the present invention, when a power resource included in the transmission resource available for use in the packet transmission is left, the determination unit can be configured to add the power resource to the amount of power resources determined as the transmission method to be used in the packet transmission.

In the first aspect of the present invention, the storage unit can be configured to store, as the transmission method, an offset value of the amount of power resources to be used in the packet transmission, and the step width of the offset value of the power resource can be set to less than 1 dB in the storage unit.

A second aspect of the present invention is summarized as packet transmission control method which controls a packet transmission of a downlink to a plurality of mobile stations, the method including the steps of: creating a table which associates a transmission resource available for use in the packet transmission, radio quality information on the downlink, and a transmission method to be used in the packet transmission with one another; determining a transmission method to be used in the packet transmission on the basis of the radio quality information on the downlink reported from the mobile station, and the transmission resource available for use in the packet transmission, by referring to the table; and transmitting the packet by use of the determined transmission method.

BRIEF DESCRIPTION OF THE DRAWINGS

FIGS. 6(a) and 6(b) are diagrams each showing an example of a transmission format reference table retained by a transmission format reference table retaining unit of the MAC-hs processor unit of the baseband signal processor unit of the radio base station of the mobile communications system according to the first embodiment of the present invention.

FIGS. 10(a) and 10(b) are diagrams each showing an example of a transmission format reference table retained by a transmission format reference table retaining unit of a MAC-hs processor unit of a baseband signal processor unit of a radio base station of a mobile communications system according to Modification Example 1 of the present invention.

BEST MODES FOR CARRYING OUT THE INVENTION (Configuration of Mobile Communications System According to First Embodiment of the Present Invention)

Figure 1:
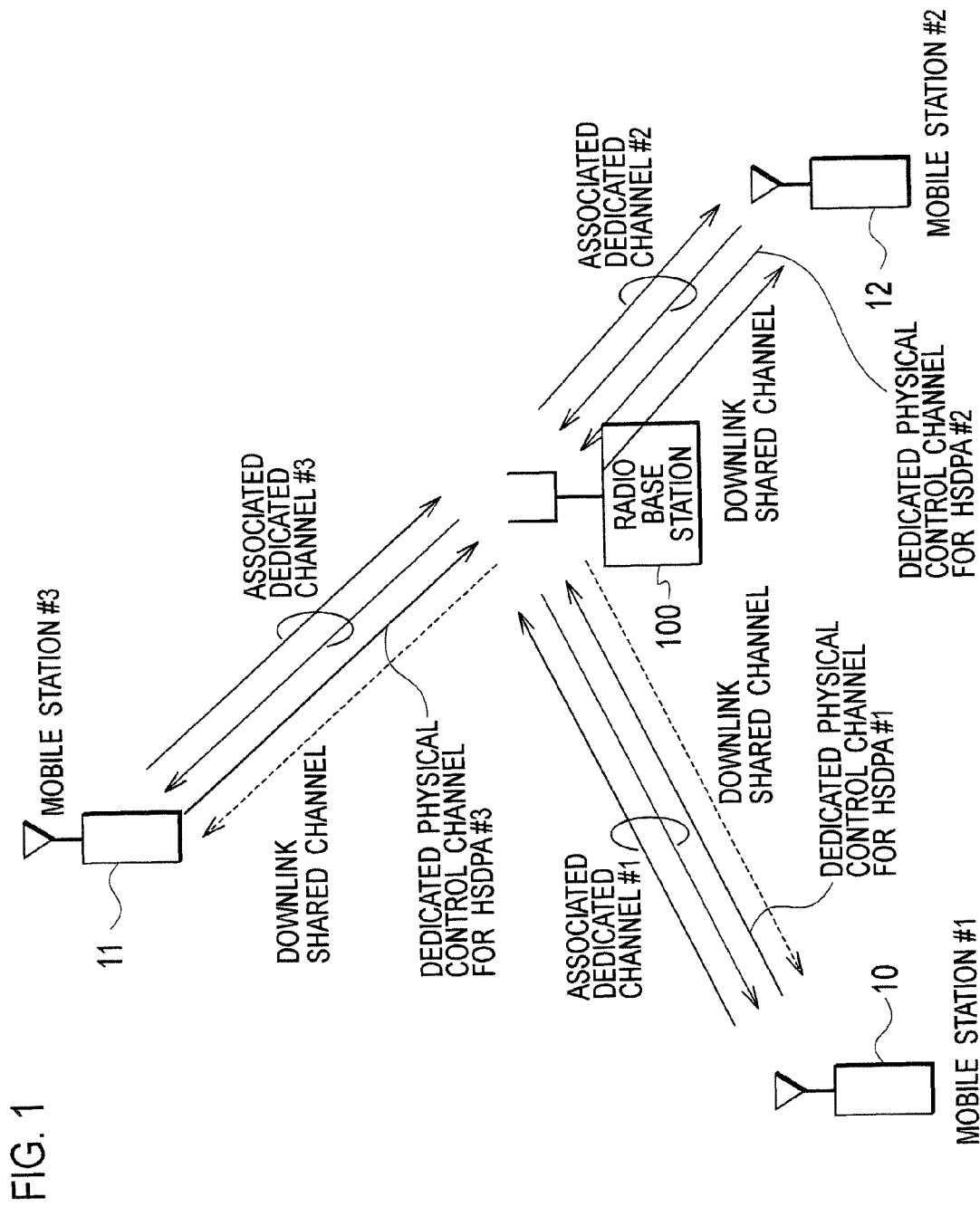
FIG. 1 is an overall configuration diagram of a mobile communications system according to one embodiment of the present invention.

Descriptions will be provided for a configuration of a mobile communications system according to a first embodiment of the present invention with reference to FIGS. 1 to 6. FIG. 1 is a diagram showing a configuration example of a mobile communications system to which a packet transmission control method according to the first embodiment of the present invention is applied.

As shown in FIG. 1, the mobile communications system according to the present embodiment includes a radio base station 100 and a plurality of mobile stations (#1 to #3) 10 to 12. Moreover, it is assumed that the HSDPA system is applied to the mobile communications system according to the present embodiment.

In the downlink of the HSDPA system, there are used a downlink shared channel such as a shared channel HS-DSCH in the downward direction and a shared control channel HS- SCCH (Shared Control Channel) in the downward direction, which are used commonly by the mobile stations (#1 to #3) 10 to 12, and associated dedicated channels #1 to #3 (bidirectional channels) or the like each associated to a physical channel assigned individually to the mobile stations (#1 to #3) 10 to 12. Note that, in the example of FIG. 1, since the downlink shared channel to the mobile station #2 is represented by the solid line, it is supposed that the downlink shared channel is assigned to the mobile station #2.

Through the associated dedicated channels #1 to #3 in the upward direction, other than user data, a pilot symbol, or a power control command (TPC command) for transmitting an associated dedicated channel in the downward direction is transmitted.

On the other hand, through the associated dedicated channels #1 to #3 in the downward direction, a transmission power control command or the like for transmitting an associated dedicated channel in the upward direction is transmitted.

Moreover, in the uplink, not only associated dedicated channels but also dedicated physical control channels (HS-DPCCH) for the HSDPA are used. Note that, through the dedicated physical control channels (HS-DPCCH) for the HSDPA, radio quality information (CQI) in the downward direction being used in a scheduling process of a shared channel or the AMC system, or acknowledgement information (ACK/NACK) or the like for reporting acknowledgement in the H-ARQ (Hybrid-ARQ) control is transmitted.

In the present embodiment, each of the mobile stations (#1 to #3) 10 to 12 has the same configuration and functions. Moreover, in the present embodiment, the radio base station needs to determine a downlink packet transmission method (a transmission format and a transmission resource) with respect to each of the plurality of mobile stations. Accordingly, hereinafter, unless specifically stated otherwise, descriptions are supposedly to be given of a mobile station N which is arbitrarily selected among the plurality of mobile stations.

Figure 2:
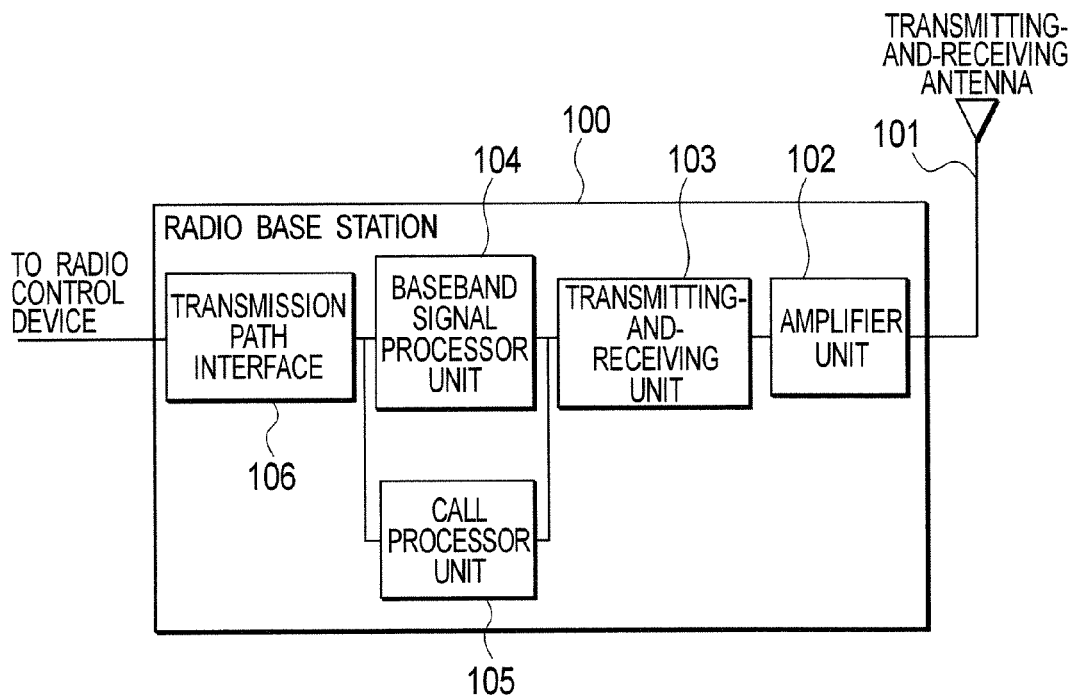
FIG. 2 is a functional block diagram of a radio base station of the mobile communications system according to one embodiment of the present invention.

FIG. 2 is a functional block diagram showing a configuration example of the radio base station 100 according to the present embodiment. As shown in FIG. 2, the radio base station 100 according to the present embodiment is provided with a transmitting-and-receiving antenna 101, an amplifier unit 102, a transmitting-and-receiving unit 103, a baseband signal processor unit 104, a call processor unit 105, and a transmission path interface 106.

The transmitting-and-receiving antenna 101 is configured to transmit and receive a radio frequency signal to and from the transmitting-and-receiving antennas of the plurality of mobile stations (#1 to #3) 10 to 12.

The amplifier 102 is configured to amplify a radio frequency signal in the upward direction, which is received by the transmitting-and-receiving antenna 101, and then to output the signal to the transmitting-and-receiving unit 103. Furthermore, the amplifier 102 is configured to amplify a radio frequency signal in the downward direction, which is output from the transmitting-and-receiving unit 103, and then to output the signal to the transmitting-and-receiving antenna 101.

The transmitting-and-receiving unit 103 is configured to carry out a frequency conversion process, which converts a baseband signal output from the baseband signal processor unit 104 into a radio frequency signal, and then to output the signal to the amplifier unit 102. Moreover, the transmitting-and-receiving unit 103 is configured to carry out a frequency conversion process, which converts a radio frequency signal output from the amplifier unit 102 into a baseband signal, and then to output the signal to the baseband signal processor unit 104.

The baseband signal processor unit 104 is configured to create a baseband signal by carrying out a retransmission control (H-ARQ control) process, a scheduling process, a transmission method determination process, a channel coding process, a spreading process, or the like, on a downlink packet outputted from the transmission path interface 106, and then to output the baseband signal to the transmitting-and-receiving unit 103.

Moreover, the baseband signal processor unit 104 is configured to carry out a despreading process, a RAKE combining process, an error correction decoding process, or the like, on the baseband signal outputted from the transmitting-and-receiving unit 103, and then to output the signal to the transmission path interface 106.

Here, a baseband signal includes radio quality information (CQI) of each of the mobile stations, which the radio quality information is to be used in a MAC-hs (Media Access Control-HSDPA) process to be described later, acknowledgement information (ACK/NACK/DTX) in the H-ARQ process, or the like. Such information is subjected to a decoding process in a layer-1 processor unit 111 in the baseband processor unit 104, and is then used in a MAC-hs processor unit 112 in the baseband processor unit 104 as described later.

The call processor unit 105 is configured to perform the condition management of the radio base station 100, and the resource assignment of the radio base station 100, by transmitting and receiving a call process control signal to and from a radio control device located in an upper level of the radio base station 100 via the transmission path interface 106. The transmission path interface 106 is configured to transmit and receive information to and from the radio control device.

Figure 3:
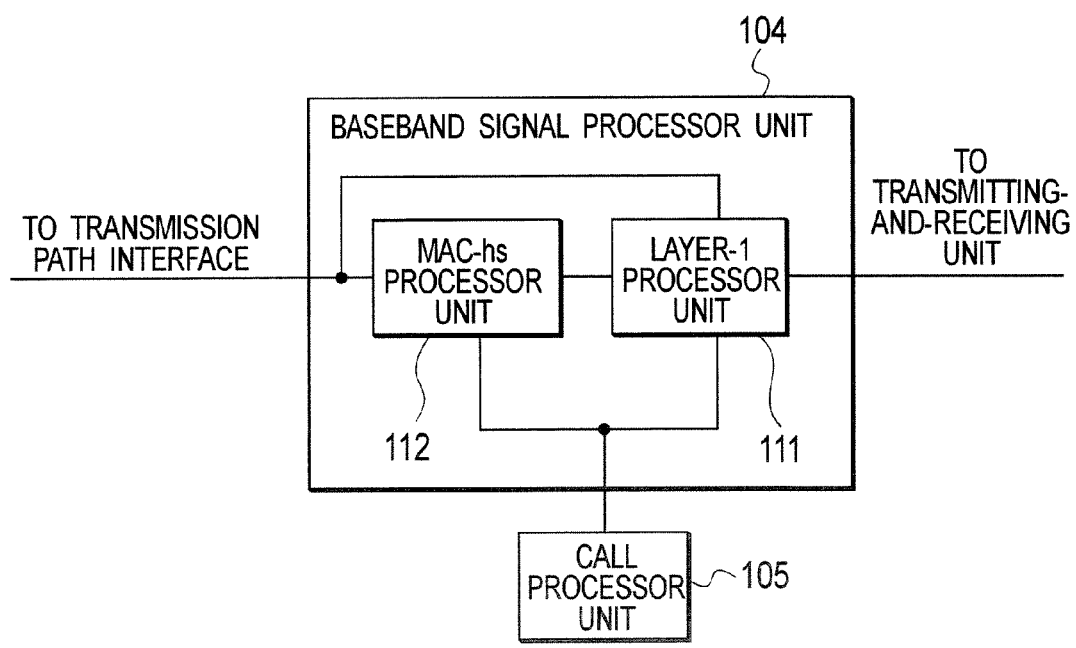
FIG. 3 is a functional block diagram of a baseband signal processor unit of the radio base station of the mobile communications system according to one embodiment of the present invention.

A configuration of the aforementioned baseband signal processor unit 104 will be described in detail with reference to FIG. 3. As shown in FIG. 3, the baseband signal processor unit 104 is provided with the layer-1 processor unit 111 and the MAC-hs processor unit 112. Note that each of the layer-1 processor unit 111 and the MAC-hs processor unit 112 are connected to the call processor unit 105.

The layer-1 processor unit 111 is configured to perform a channel coding process in the downward direction, a channel decoding process in the upward direction, a transmission power control process of dedicated channels in the upward direction and the downward direction, a RAKE combining process, or a spreading or despreading process.

Moreover, the layer-1 processor unit 111 is configured to receive information (radio quality information, CQI) indicating downlink radio conditions reported by use of a dedicated physical control channel (HS-DPCCH) in the upward direction from each of the mobile stations, or acknowledgement information (ACK/NACK/DTX) in the H-ARQ control, and then to output the information to the MAC-hs processor unit 112.

The MAC-hs processor unit 112 is configured to carry out an H-ARQ control process in a shared channel in the downward direction in the HSDPA system, a scheduling process with respect to a packet waiting to be transmitted, or a determination process of a transmission method (a transmission format and a transmission resource) to be used in the down packet transmission.

Figure 4:
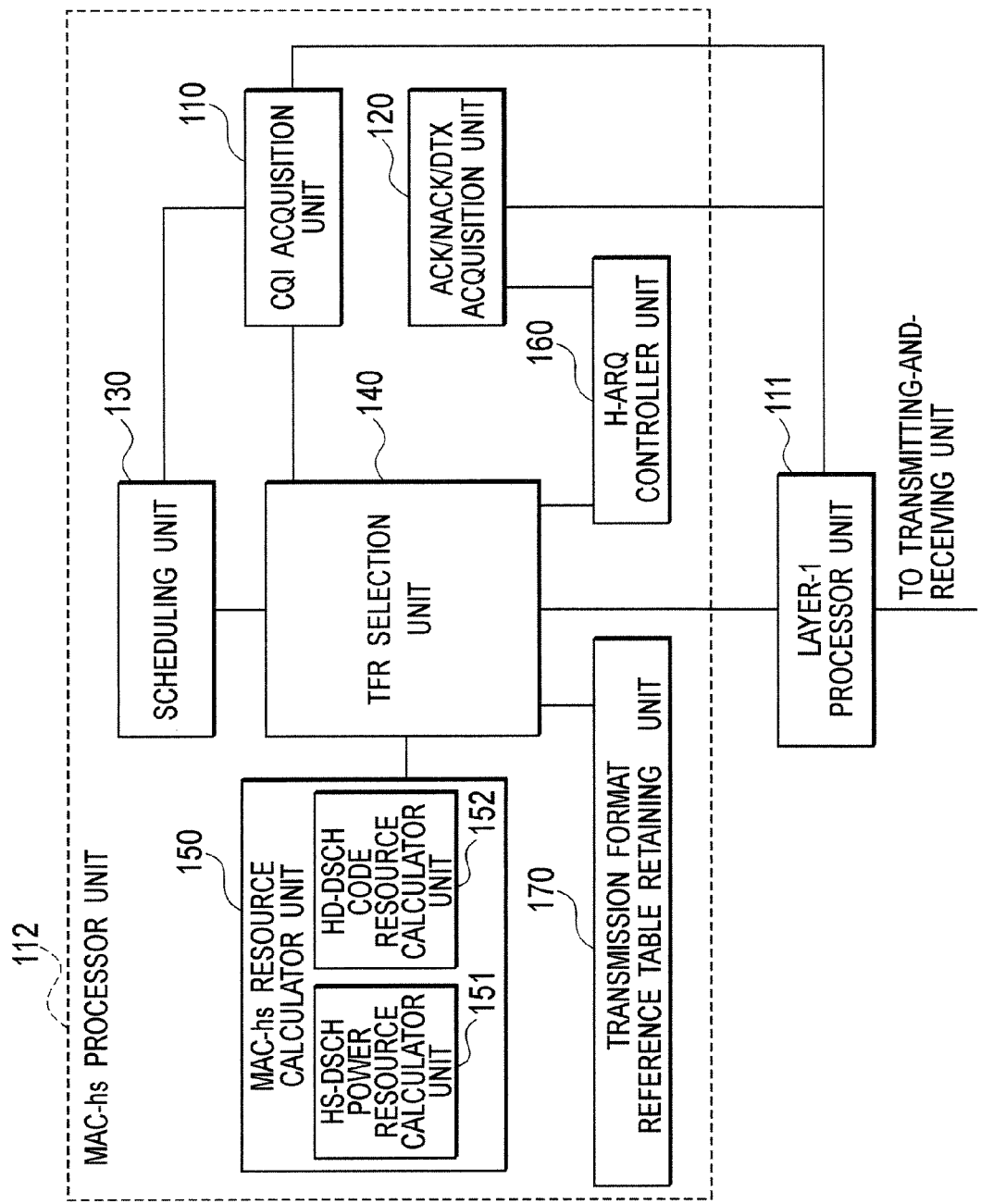
FIG. 4 is a functional block diagram of a MAC-hs processor unit of the baseband signal processor unit of the radio base station of the mobile communications system according to a first embodiment of the present invention.

A configuration of the aforementioned MAC-hs processor unit 112 will be described in detail with reference to FIG. 4. As shown in FIG. 4, the MAC-hs processor unit 112 is provided with a CQI acquisition unit 110, an ACK/NACK/DTX acquisition unit 120, a scheduling unit 130, a TFR (Transport Format Resource) selection unit 140, a MAC-hs resource calculator unit 150, an H-ARQ controller unit 160, and a transmission format reference table retaining unit 170.

Note that, although the MAC-hs processor unit 112 is provided with functions such as a function to control a flow control, in addition to the aforementioned functions, the descriptions of, and the explanations of, such functions are omitted here since they are not directly related to the present invention.

The CQI acquisition unit 110 is configured to acquire downlink radio quality information (CQI) which has been subjected to the decoding process by the layer-1 processor unit 111, and then to output the information to the scheduling unit 130 and the TFR selection unit 140.

The ACK/NACK/DTX acquisition unit 120 is configured to acquire acknowledgement information (ACK/NACK/DTX) which has been subjected to the decoding process by the layer-1 processor unit 111 in the H-ARQ control, and then to output the information to the H-ARQ controller unit 160.

The scheduling unit 130 is configured to determine, by use of an arbitrary scheduling algorithm, a mobile station (a mobile station to which a downlink packet is transmitted) to which an HS-DSCH is assigned in each TTI (Transmission Time Interval), and then to notify the TFR selection unit 140 of a mobile station ID for identifying the mobile station.

Here, in a case where the scheduling unit 130 has scheduled to transmit the downlink packet to the plurality of mobile stations in the TTI, the scheduling unit 130 notifies the TFR selection unit 140 of a plurality of mobile station IDs to which priority information has been added.

The TFR selection unit 140 is configured to receive, from the CQI acquisition unit 110, CQI (downlink radio quality information) reported by each of the mobile stations, then to receive retransmission information from the H-ARQ controller unit 160, and then to receive radio resource information from the MAC-hs resource calculator unit 150. Here, the retransmission information is information indicating whether the packet to be transmitted in the TTI is to be transmitted for the first time or to be retransmitted in the H-ARQ control. Furthermore, the radio resource information is information indicating a transmission resource (an amount of code resource and an amount of power resource) available for use in the packet transmission in the TTI.

Furthermore, the TFR selection unit 140 is connected to the transmission format reference table retaining unit 170, and is configured to determine the transmission method (a transmission format and a transmission resource) to be used in the transmission of a packet (HS-DSCH) by referring to a transmission format reference table retained in the transmission format reference table retaining unit 170, on the basis of the received CQI and radio resource information.

Here, the TFR selection unit 140 determines the transport block size to be used in the packet transmission, the modulation scheme to be used in the packet transmission, the amount of code resource to be used in the packet transmission, the amount of power resource to be used in the packet transmission, or the like.

Moreover, the details of the process in which the TFR selection unit 140 determines the transmission method (a transmission format and a transmission resource) will be described later.

The MAC-hs resource calculator unit 150 is provided with an HS-DSCH power resource calculator unit 151 and an HS-DSCH code resource calculator unit 152. The MAC-hs resource calculator unit 150 is configured to calculate the transmission resource (for example, a radio resource such as a power resource or a code resource) available for use in the transmission of a packet (HS-DSCH) by use of the HS-DSCH power resource calculator unit 151, the HS-DSCH code resource calculator unit 152, and the like, and then to notify the TFR selection unit 140 of the transmission resource (for example, a radio resource such as a power resource or a code resource) available for use in the packet transmission in the TTI.

Here, in a case where a downlink packet transmission to a plurality of the mobile stations is performed in the TTI, since the TFR selection unit 140 determines transmission formats and transmission resources sequentially from a mobile station with a higher priority than another, the MAC-hs resource calculator unit 150 notifies the TFR selection unit 140 of a power resource and a code resource available for use in each of the mobile stations when the TFR selection unit 140 determines the transmission format and the transmission resource.

Specifically, the MAC-hs resource calculator unit 150 notifies the TFR selection unit 140 of all of the amounts of the power resources and code resources available for use in the TTI with respect to the mobile station with the highest priority.

Moreover, with respect to a mobile station with the second highest priority, the MAC-hs resource calculator unit 150 notifies the TFR selection unit 140 of, as the amounts of the power resources and code resources available for use in the mobile station with the second highest priority, values obtained by subtracting the amounts of power resource and of code resource to be used in the mobile station with the highest priority from the amounts of all of the power resources and code resources available for use in the TTI, respectively.

Furthermore, with respect to a mobile station with the third priority or a priority lower than the third priority, in a similar manner to that of the case of the mobile station with the second highest priority, the MAC-hs resource calculator unit 150 notifies the TFR selection unit 140 of, as the amounts of the power resources and code resources available for use in the mobile station, values obtained by subtracting the amounts of power resource and of code resource to be used in mobile stations with the higher priorities than that with the mobile station from the amounts of the power resources and code resources available for use in the TTI, respectively.

The H-ARQ controller unit 160 is configured to perform an H-ARQ retransmission control on the basis of the feedback of the acknowledgement information (ACK/NACK/DTX) in the upward direction as to each data queue included in each of the mobile stations.

Figure 5:
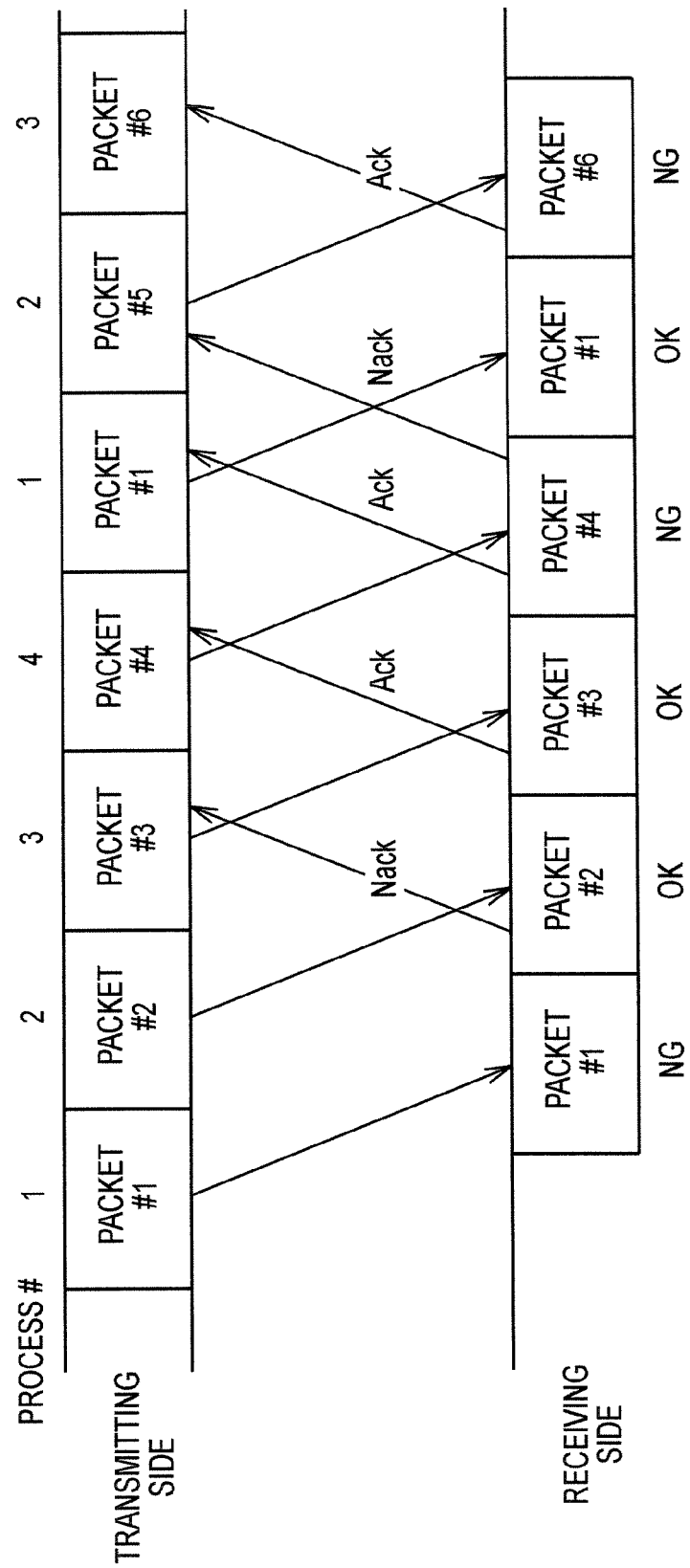
FIG. 5 is a diagram showing an example of an operation of a stop-and-wait protocol performed by an H-ARQ controller unit of the MAC-hs processor unit of the baseband signal processor unit of the radio base station of the mobile communications system according to the first embodiment of the present invention.

In FIG. 5, an operation example of a stop-and-wait protocol, which is performed in the H-ARQ controller unit 160, is shown. In the stop-and-wait protocol (ARQ), the receiving side (the mobile station side) is configured to reply with acknowledgement information (ACK/NACK/DTX) by use of the HS-DPCCH, upon receipt of a downlink packet from the transmitting side (the radio base station side).

In the example of FIG. 5, the receiving side has failed to receive packet #1 correctly, so that the receiving side replies with a negative response (NACK) to the transmitting side. Moreover, the receiving side has received packet #2 correctly, so that the receiving side replies with an affirmative response (ACK) to the transmitting side. Likewise, in the receiving side, an operation to reply with an affirmative response (ACK) or a negative response (NACK) to the transmitting side is repeated in the sequence of received packets.

Moreover, the H-ARQ controller unit 160 notifies the TFR selection unit 140 of the information (retransmission information) indicating that the packet to be transmitted in the TTI is to be transmitted for the first time or to be retransmitted (whether the packet is to be transmitted for the second time or later) in the H-ARQ control.

The transmission format reference table retaining unit 170 retains a transmission format reference table which associates transmission resources available for use in a packet transmission, downlink radio quality information (CQI), and transmission methods (transmission formats and transmission resources) to be used in the packet transmission with one another.

Specifically, the transmission format reference table is a table indicating, for each amount of code resource available for use in the packet transmission in the TTI, relationships of downlink radio quality information (CQI), transport block sizes to be used in the packet transmission, amounts of code resource to be used in the packet transmission, modulation schemes to be used in the packet transmission, and the power offsets of the power resources to be used in the packet transmission.

FIGS. 6(*a*) and 6(*b*) respectively show examples of such a transmission format reference table.

In FIG. 6(*a*), there is shown a table which associates the downlink radio quality information (CQI), the transport block sizes to be used in the packet transmission, the amounts of code resource to be used in the packet transmission, the modulation schemes to be used in the packet transmission, and the power offsets of the power resource to be used in the packet transmission with one another, in a case where the amount of the code resource available for use in the packet transmission in the TTI is "4".

Furthermore, in FIG. 6(*b*), there is shown a table which associates the downlink radio quality information (CQI), the transport block sizes to be used in the packet transmission, the amounts of code resource to be used in the packet transmission, the modulation schemes to be used in the packet transmission, and the power offsets of the power resource to be used in the packet transmission, in a case where the amount of the code resource available for use in the packet transmission in the TTI is "5".

Actually, since the number of codes that the HS-PDSCH possibly takes is "1" to "15", the transmission format reference table retaining unit 170 retains tables each for 15 different amounts of code resource available for use.

The transmission format reference table retaining unit 170 is capable of outputting, to the TFR selection unit 140, the transport block size to be used in the packet transmission in the TTI with the function TF_Related_TBS (the amount of code resource, CQI) in a case where the arguments are "the amount of code resource available for use in the TTI" and "CQI".

Alternatively, the transmission format reference table retaining unit 170 is capable of outputting, to the TFR selection unit 140, the amount of code resource to be used in the packet transmission in the TTI with the function TF_Related_Code (the amount of code resource, CQI) in a case where the arguments are "the amount of code resource available for use in the TTI" and "CQI".

Alternatively, the transmission format reference table retaining unit 170 is capable of outputting, to the TFR selection unit 140, the modulation scheme to be used in the packet transmission in the TTI with the function TF_Related_Mod (the amount of code resource, CQI) in a case where the arguments are "the amount of code resource available for use in the TTI" and "CQI".

Alternatively, the transmission format reference table retaining unit 170 is capable of outputting, to the TFR selection unit 140, the offset value of the amount of power resource to be used in the packet transmission in the TTI with the function TF_Related_Offset (the amount of code resource, CQI) in a case where the arguments are "the amount of code resource available for use in the TTI" and "CQI".

Alternatively, the transmission format reference table retaining unit 170 is capable of outputting, to the TFR selection unit 140, the CQI corresponding to the transmission method to be used in the packet transmission in the TTI with the function TF_Related_CQI (the amount of code resource, the transport block size) in a case where the arguments are "the amount of code resource available for use in the TTI" and "the transport block size to be used in the TTI".

Here, "the CQI corresponding to the transmission method to be used in the packet transmission in the TTI" is "the minimum CQI available for transmitting the transport block size to be used in the packet transmission in the TTI".

Here, CQI in a transmission format reference table for each of the amounts of code resource available for use in a packet transmission are values each corresponding to an SIR which becomes necessary in a case where a packet is transmitted by the transmission method determined on the basis of a transport block size to be used in the packet transmission, an amount of code resource to be used in the packet transmission, a modulation scheme to be used in the packet transmission, or an offset value of the amount of power resource to be used in the packet transmission.

However, since there exist multiple combinations of the aforementioned transportation block size, the amount of code resource, the modulation scheme, and the offset value of an amount of power resource, with respect to specific CQI, the combinations that make the transport block size the maximum, among these combinations, are set in the transmission format reference table.

Specifically, in a case where CQI (downlink radio quality information) and a code resource available for use in the packet transmission is fixed, the transport block size is set so as to fulfill a predetermined packet error rate, and so as to become the maximum value.

Hereinafter, a specific reference method of the transmission format reference tables will be described in detail.

For example, in a case where the amount of code resource available for use in the TTI is "4" and the CQI is "15", the transmission format reference table retaining unit 170 refers to FIG. 6(*a*), and then outputs "transport block size TBS=2876" with the function TF_Related_TBS (the amount of code resource, CQI).

Furthermore, in a case where the amount of code resource available for use in the TTI is "5" and the CQI is "10", the transmission format reference table retaining unit 170 refers to FIG. 6(*b*), and then outputs "the amount of code resource to be used in the packet transmission=4" with the function TF_Related_Code (the amount of code resource, CQI).

Moreover, in a case where the amount of code resource available for use in the TTI is "4" and the CQI is "20", the transmission format reference table retaining unit 170 refers to FIG. 6(*a*), and then outputs "the modulation scheme to be used in the packet transmission=16QAM" with the function TF_Related_Mod (the amount of code resource, CQI).

Furthermore, in a case where the amount of code resource available for use in the TTI is "5" and the CQI is "28", the transmission format reference table retaining unit 170 refers to FIG. 6(*b*), and then outputs "the offset value of the amount of power resource to be used in the packet transmission=−6" with the function TF_Related_Offset (the amount of code resource, CQI).

Moreover, in a case where the amount of code resource available for use in the TTI is "4" and the transport block size is "4265," the transmission format reference table retaining unit 170 refers to FIG. 6(a), and then outputs "CQI corresponding to the transmission method to be used in the packet transmission=18" with the function TF_Related_CQI (the amount of code resource, the transport block size).

Furthermore, in a case where the transport block size is "4581", the transmission format reference table retaining unit 170 refers to FIG. 6(a), then determines that "CQI=19" is "the minimum CQI available for transmitting the transport block", and then outputs "CQI corresponding to the transmission method to be used in the packet transmission=19" with the function TF_Related_CQI (the amount of code resource, the transport block size).

Note that, although the transmission format reference tables shown in FIGS. 6(a) and 6(b), respectively, are tables in which QPSKs and 16QAMs co-exist as the modulation scheme, in order to support the mobile station capable of supporting only QPSKs, the transmission format reference table retaining unit 170 may be configured to retain transmission format reference tables each constituted of QPSKs only.

Note that, in a case where downlink radio quality information (CQI), and a code resource available for use in the packet transmission are fixed in a transmission format reference table, the transport block size is set so as to fulfill a predetermined packet error rate, and also so as to become the maximum value.

Note that, as will be described later, the TFR selection unit 140 may be configured to reduce the amount of power resource ($Power_0$) determined as the transmission method (refer to step S31 of FIG. 9) in a case where the data amount of the packet to be transmitted is smaller than the transport block size ($TBS_0$) which is determined as the transmission method.

Moreover, as will be described later, the TFR selection unit 140 may be configured to determine the amount of power resource to be reduced ($Power_1$) in accordance with "(the amount of power resource to be reduced $Power_1$)={(radio quality information $CQI_0$ corresponding to the transport block size determined as the transmission method)−(radio quality information $CQI_1$ corresponding to the amount of data of the packet to be transmitted)}×(an arbitrary coefficient, α)" (refer to step S31 of FIG. 9).

Moreover, as will be described later, in the case where the amount of power resource is reduced, and in the case where the amount of power resource to be used in the packet transmission ($Power_1$) is smaller than a predetermined lower limit value ($Power_{MIN}$), the TFR selection unit 140 may be configured to determine the predetermined lower limit value ($Power_{MIN}$) as the power resource to be used in the packet transmission ($Power_1$) (refer to step S32 of FIG. 9).

Furthermore, as will be described later, in a case where the transport block size ($TBS_0$) determined as the transmission method is smaller than the minimum data transmission unit ($TBS_{MIN}$), the TFR selection unit 140 may be configured to cancel the transmission of the downlink packet to the mobile station, and then to transmit the downlink packet to another mobile station (refer to step S27 of FIG. 9).

Moreover, as will be described later, in a case where the transport block size ($TBS_0$) determined as the transmission method is smaller than the minimum unit of the data amount to be transmitted, the TFR selection unit 140 may be configured to determine the transmission method so that the packet can be transmitted with the minimum data transmission unit ($TBS_{MIN}$).

Furthermore, as will be described later, the TFR selection unit 140 may be configured to determine the transmission method so that the transmission resource available for use in the packet transmission can be uniformly assigned to a plurality of mobile stations at a single transmission timing.

Moreover, as will be described later, the TFR selection unit 140 may be configured to determine the transmission method by modifying the downlink radio quality information to "downlink radio quality information−$10 \times \log_{10} N$" in the case that the number of mobile stations to which the packet is to be transmitted in addition to the mobile station is N, and then by reducing the amount of power resource determined as the transmission method by the amount corresponding to "$10 \times \log_{10} N$", when determining the transmission method of the mobile station performing the packet transmission.

Furthermore, as will be described later, in a case where a packet which has been previously transmitted is to be retransmitted, the TFR selection unit 140 may be configured to reduce the amount of power resource determined as the transmission method, in a case where it is determined that the current radio conditions are better than the radio conditions when the packet has been previously transmitted on the basis of the previous downlink radio quality information, the current downlink radio quality information, the transmission resource available for use in the previous packet transmission, and the transmission resource available for use in the current packet transmission.

Moreover, as will be described later, the TFR selection unit 140 may be configured to determine the amount of power resource to be reduced in accordance with "(the amount of power resource to be reduced)={(the current downlink radio quality information)−(the previous downlink radio quality information)}×(an arbitrary coefficient)+{(the power resource available for use in the current packet transmission)−(the power resource available for use in the previous packet transmission)}×(an arbitrary coefficient)".

Furthermore, as will be described later, in a case where the amount of power resource is reduced, and in a case where the amount of power resource to be used in the packet transmission is smaller than a predetermined lower limit value, the TFR selection unit 140 may be configured to determine the predetermined lower limit value as the amount of power resource to be used in the packet transmission.

Moreover, as will be described later, in a case where the packet which has previously transmitted is to be retransmitted, and in a case where it is determined that the current radio conditions are not better than the radio conditions when the packet has been previously transmitted on the basis of the previous downlink radio quality information, the current downlink radio quality information, the transmission resource available for use in the previous packet transmission, and the transmission resource available for use in the current packet transmission, the TFR selection unit 140 may determine the aforementioned transmission method so that the transmission resource available for use in the packet transmission is utilized to the fullest extent.

Furthermore, as will be described later, in a case where the modulation scheme determined as the transmission method at the time of the previous packet transmission is 16QAM, and in a case where the coding rate becomes smaller than a predetermined value when the modulation scheme is changed to QPSK, the TFR selection unit 140 may determine the aforementioned transmission method in order that the transmission resource available for use in the packet transmission can be utilized to the full extent by changing the modulation scheme to be used in the packet transmission to QPSK.

Moreover, as will be described later, the TFR selection unit 140 may determine the aforementioned transmission method so that the transmission resource available for use in the packet transmission can be utilized to the fullest extent by increasing the amount of code resource to be used in the transmission of the packet within a range that keeps the coding rate greater than 1/3.

Furthermore, as will be described later, in a case where the downlink radio quality information reported from a mobile station is larger than a predetermined upper limit value of the radio quality information, the TFR selection unit 140 may determine the aforementioned transmission method by changing the downlink radio quality information reported from the mobile station to the predetermined upper limit value of the radio quality information.

As a result, in the TTI, the downlink packet is transmitted to a predetermined mobile station by use of a transmission method determined by the TFR selection unit 140.

(Operation of Mobile Communications System According to the First Embodiment of the Invention)

By referring to FIGS. 7 and 8, descriptions will be given of an operation of the MAC-hs processor unit 112 in the mobile communications system according to the present embodiment to determine a transmission method (a transmission format and a transmission resource) to be used in the transmission of a packet in the TTI.

In this embodiment, an operation to determine a transmission method (a transmission format and a transmission resource) to be used in a downlink packet transmission to a mobile station determined by the scheduling unit 130 (hereinafter, termed as the mobile station) will be described. Furthermore, in this embodiment, in a case where a downlink packet is to be transmitted to a plurality of mobile stations in the TTI, the operation is applied thereto in a sequence from a mobile station with a higher priority than that of others.

Here, in the transmission method (a transmission format and a transmission resource) determined by the TFR selection unit 140, the transport block size is set to "$TBS_1$", the amount of code resource is set to be "$Code_1$", the modulation scheme is set to be "$Mod_1$", the amount of power resource is set to be "$Power_1$", and CQI corresponding to the determined transmission method (a transmission format and a transmission resource) is set to be "$CQI_1$".

Moreover, in this embodiment, it is supposed that the CQI and the amount of power resource are calculated in a region of "dB".

Figure 7:
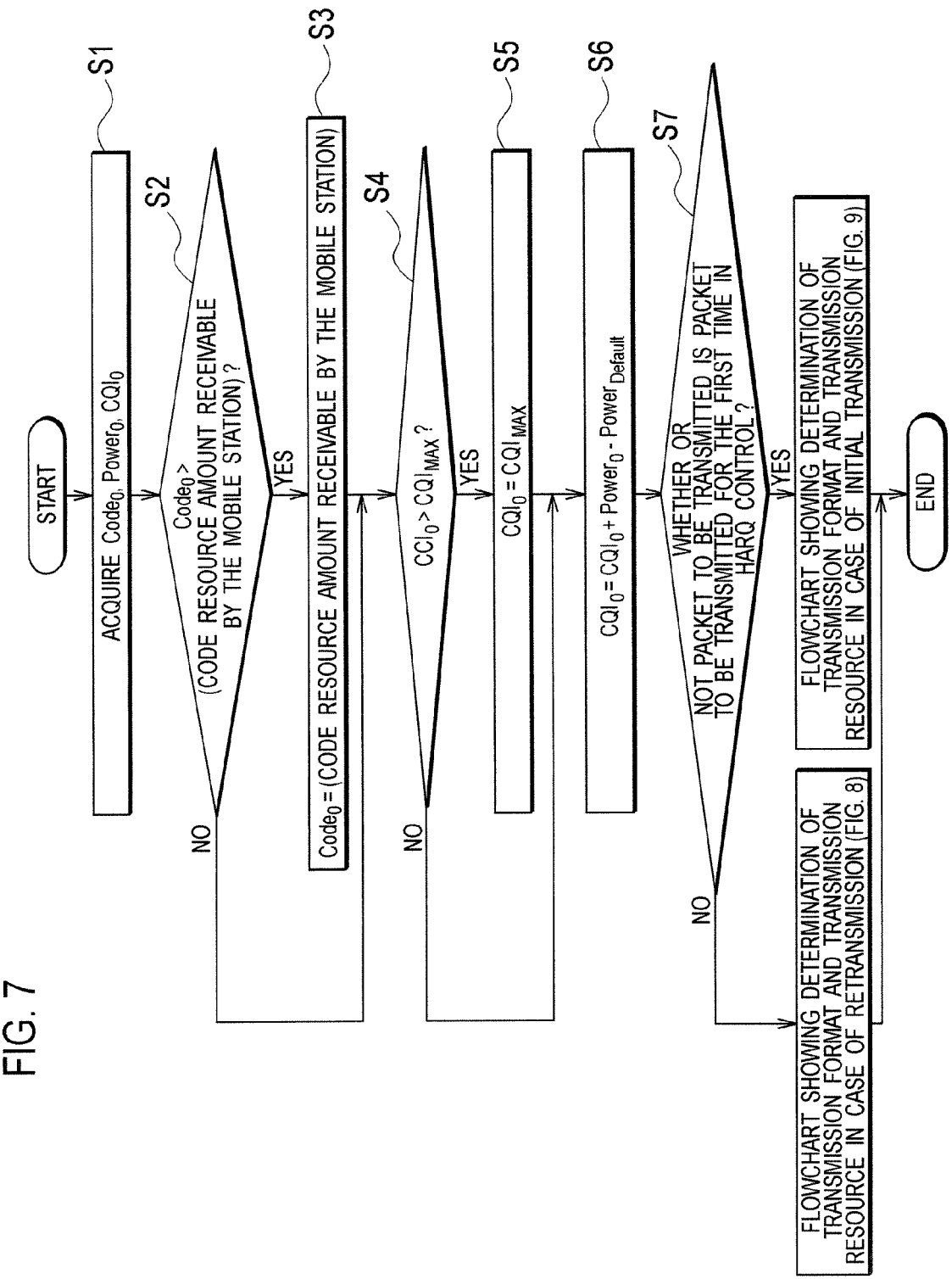
FIG. 7 is a flowchart showing an operation of determining a downlink packet transmission method in a TFR selection unit of the MAC-hs processor unit of the baseband signal processor unit of the radio base station of the mobile communications system according to the first embodiment of the present invention.

As shown in FIG. 7, in step S1, the TFR selection unit 140 acquires CQI reported from each of the mobile stations, from the CQI acquisition unit 110, and acquires the amounts of code resource and of the power resource available for use in the TTI, from the MAC-hs resource calculator unit 150. Here, the TFR selection unit 140 sets the acquired CQI to be "$CQI_0$", the acquired amount of code resource to be "$Code_0$", and the acquired amount of power resource to be "$Power_0$".

In step S2, in a case where "$Code_0$" is larger than the amount of code resource receivable by the mobile station, the operation proceeds to step S3, and in any other case, the operation proceeds to step S4.

In step S3, the TFR selection unit 140 sets the amount of code resource receivable by the mobile station to be "$Code_0$".

In step S4, in a case where "$CQI_0$" is larger than "$CQI_{MAX}$" which is the upper limit value of CQI, the operation proceeds to step S5, and in any other case, the operation proceeds to step S6.

In step S5, the TFR selection unit 140 sets "$CQI_{MAX}$" to be "$CQI_0$".

Note that, although CQI are reported in values within a range of "1 to 30" for the sake of definition, there exists a case where, dependent on the ability of a mobile station, highly accurate CQI can be reported as to the values "1 to 25", but where, as to the values "26 to 30", only CQI with low accuracy can be reported, for example.

At this time, in a case where CQI having a value of "26 to 30" is reported, the TFR selection unit 140 determines a transmission method (a transmission format and a transmission resource) by use of CQI with low accuracy. As a result, there exists a problem that the packet error rate increases. Accordingly, by setting the upper limit value "$CQI_{MAX}$" of CQI to be "25", it is possible that the TFR selection unit 140 avoids determining a transmission method (a transmission format and a transmission resource) by use of CQI with low accuracy.

Since CQI is calculated assuming that all the transmission powers of a shared channel in the downward direction be "$Power_{Default}$" in a mobile station, in step S6, the TFR selection unit 140 reads "$CQI_0$" by changing it to a value based on "$Power_0$". Specifically, the TFR selection unit 140 sets the value calculated on the basis of "$CQI_0+Power_0-Power_{Default}$" to be "$CQI_0$".

In step S7, the TFR selection unit 140 judges whether or not the packet to be transmitted is to be transmitted for the first time in the H-ARQ control, on the basis of retransmission information transmitted from the H-ARQ controller unit 160. In a case where it is the initial transmission in the H-ARQ control, the operation proceeds to step 21 (refer to FIG. 9), and in any other case (that is, in a case where it is a retransmission), the operation proceeds to step S8 (refer to FIG. 8).

Figure 8:
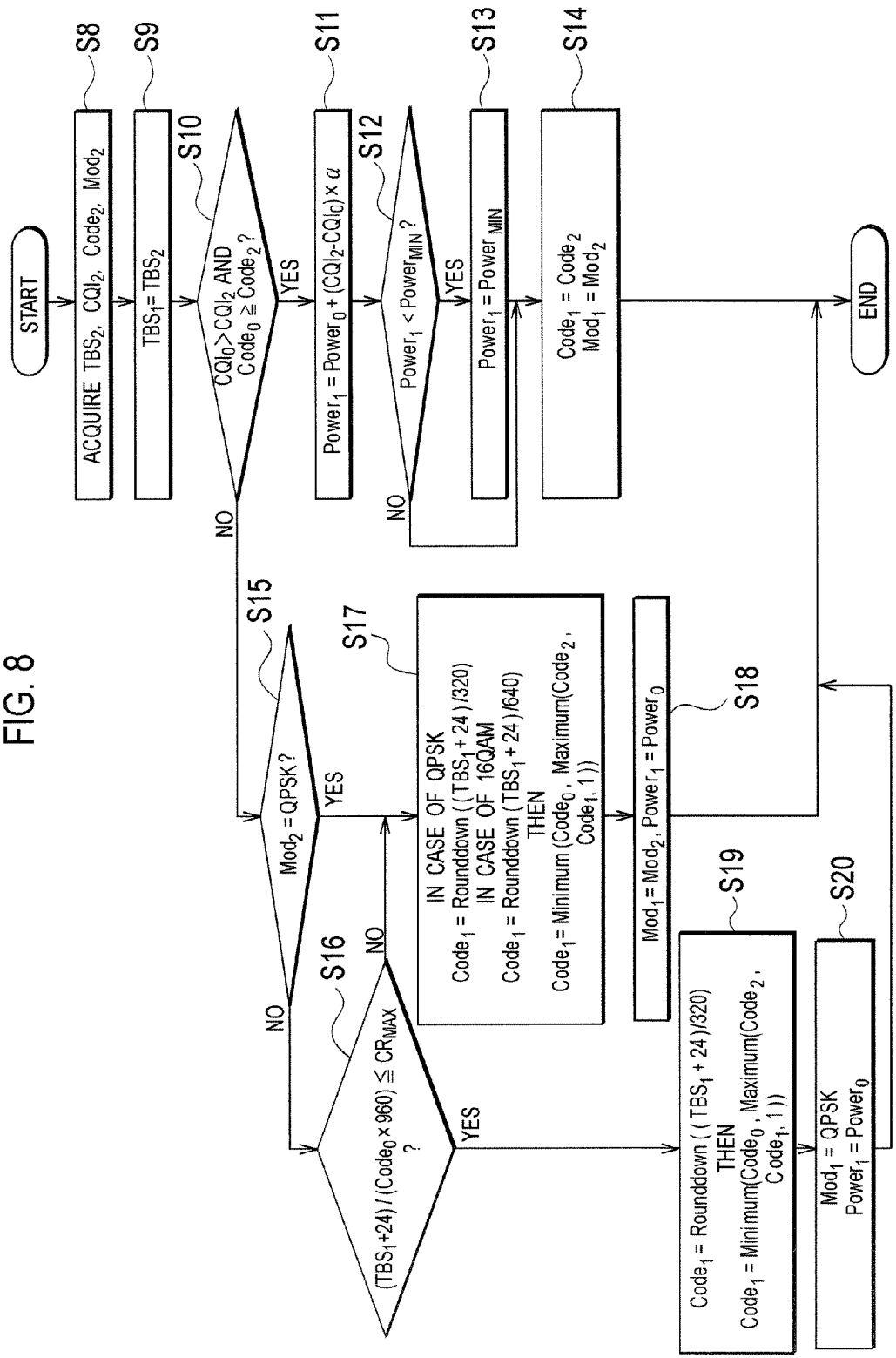
FIG. 8 is a flowchart showing an operation of re-determining a transmission method of a downlink packet in the TFR selection unit of the MAC-hs processor unit of the baseband signal processor unit of the radio base station of the mobile communications system according to the first embodiment of the present invention.

As shown in FIG. 8, at the time of a retransmission in the H-ARQ control, in step S8, the TFR selection unit 140 acquires the transport block size "$TBS_2$", CQI "$CQI_2$", the amount of code resource "$Code_2$", and the modulation scheme "$Mod_2$", at the time of the initial transmission of the packet which is to be retransmitted. Here, "$TBS_2$", "$CQI_2$", "$Code_2$", and "$Mod_2$", correspond to "$TBS_1$", "$CQI_1$", "$Code_1$", and "$Mod_1$", respectively, at the time of the initial transmission.

Since the transport block size at the time of a retransmission is the same as the transport block size at the time of the initial transmission, in step S9, the TFR selection unit 140 sets the transport block size "$TBS_1$" of the packet to be retransmitted to be "$TBS_2$".

In step S10, in a case where "$CQI_0>CQI_1$ is true while $Code_0 \geq Code_1$ is true", the operation proceeds to step S11, and in any other case, the operation proceeds to step S11.

Here, since "$CQI_0$" is the CQI in which a power source available for use in the packet transmission in the TTI is taken into consideration, and since "$CQI_1$" is the CQI in which the power source available for use in the packet transmission at the time of the initial transmission is taken into consideration, "$CQI_0>CQI_1$" shows that the radio channel quality in the TTI is better than the radio channel quality at the time of the initial transmission in view of the power resource. Moreover, likewise, "$Code_0 \geq Code_1$" shows the radio channel quality in the TTI is better than the radio channel quality at the time of the initial transmission in view of the code resource.

In step S11, the TFR selection unit 140 reduces the amount of power resource to be used in the packet transmission by the amount equivalent to the amount improved in the TTI from the amount of radio channel quality at the time of the initial transmission. Specifically, the TFR selection unit 140 calculates the amount of power resource "$Power_1$" to be used in the packet transmission by "$Power_1=Power_0+(CQI_2-CQI_0) \times \alpha$". Here, $\alpha$ is a predetermined constant number. Moreover, since the unit of CQI is the same as the unit of the amount of power resource, which is "dB", $\alpha$ is set to "1" for the sake of definition.

The amount of power resource to be used in the packet transmission is reduced by the improved amount of the radio channel quality by the aforementioned process, so that it is possible to perform the packet transmission by using the power resource efficiently, and also that it is possible to reduce an amount of interference to another cell.

In step S12, in a case where "$Power_1$" is smaller than a predetermined lower limit value of the amount of power resource "$Power_{MIN}$", the operation proceeds to step S13, and in any other case, the operation proceeds to step S14.

In step S13, the TFR selection unit 140 sets the value of "$Power_{MIN}$" to be "$Power_1$".

In a case where the amount of power resource to be used in the packet transmission is an excessively small value in comparison with "$Power_{Default}$", there exists a case where the linearity between the CQI and the amount of power resource collapses and the packet error rate thus considerably deteriorates.

For example, in step S11, in a case where "$CQI_2=2$", "$CQI_0=22$", and "$Power_0=Power_{Default}=40$ dBm", and "$\alpha=1$" are satisfied, it becomes "$Power_1=20$ dBm". However, since the value of "$Power_1$" is excessively small, there is a case where the packet error rate deteriorates.

Accordingly, the amount of power resource to be used in the packet transmission is set to the predetermined lower limit value "$Power_{MIN}$", so that the amount of power resource to be used in the packet transmission does not become smaller than "$Power_{MIN}$". Thereby, it is possible to prevent the deterioration of the packet error rate.

For example, by setting "$Power_{MIN}=25$ dBm", it is made possible to perform the transmission with the amount of power resource of "25 dBm", but not of "20 dBm" in a transmission method equivalent to "$CQI_2$", so that the deterioration of the packet error rate can be prevented.

In step S14, the TFR selection unit 140 sets the amounts of code resource "$Code_1$", and the modulation scheme "$Mod_1$", which are to be used in the packet transmission to be the same as the amounts of code resource "$Code_2$", and the modulation scheme "$Mod_2$" at the time of the initial transmission.

In step S15, in a case where the modulation scheme "$Mod_2$" at the time of the initial transmission is "QPSK", the operation proceeds to step S17, and in any other case (specifically, in a case where the modulation scheme "$Mod_2$" at the time of the initial transmission is "16QAM"), the operation proceeds to step S16.

In step S16, in a case where the amount of code resource is used to the fullest extent by changing the modulation scheme to "QPSK", and in a case where the coding rate of the packet to be transmitted is smaller than the predetermined upper limit value "$CR_{MAX}$" of the coding rate, the operation proceeds to step S18, and in any other case, the operation proceeds to step S17.

Here, the coding rate refers to the ratio of the number of bits (including 24 bits of CRC) of the packet to be transmitted to the number of bits in the physical channel of the packet to be transmitted. In a case where the modulation scheme is "QPSK", and in a case where "SF=16" and "TTI=3 slots" are satisfied, "the number of bits in the physical channel of the packet to be transmitted" is "2560 [chips/slot]×3 [slots]/16 [chips/symbol]×2 [bits/symbol]×(amount of code resource)= 960×$Code_0$".

In step S17, the TFR selection unit 140 calculates the amount of code resource "$Code_1$" in order to cause the coding rate to become as close to 1/3 as possible.

In a case where the modulation scheme is "QPSK", suppose that the coding rate is 1/3, since "1/3=($TBS_1$+24)/(960× (the amount of code resource))", the TFR selection unit 140 calculates "$Code_1$" in accordance with "$Code_1$=Rounddown (($TBS_1$+24)/320)".

On the other hand, in a case where the modulation scheme is "16QAM", suppose that the coding rate is 1/3, since "1/3= ($TBS_1$+24)/(1920×(the amount of code resource))", the TFR selection unit 140 calculates "$Code_1$" in accordance with "$Code_1$=Rounddown (($TBS_1$+24)/640)".

Here, the function Rounddown (x) is a function to round down the argument "x".

Moreover, the TFR selection unit 140 calculates "$Code_1$" in accordance with "$Code_1$=Minimum ($Code_0$, Maximum ($Code_2$, $Code_1$, 1))" in a manner that the amount of code resource "$Code_1$" becomes not less than "1", that the amount of code resource "$Code_1$" becomes not less than the amount of code resource "$Code_2$" at the time of the initial transmission, and that the amount of code resource "$Code_1$" becomes not greater than the amount of code resource "$Code_0$" available for use.

Here, the function Minimum (x, y, z, . . . ) and the function Maximum (x, y, z, . . . ) are functions which respectively indicate the minimum value and the maximum value among the arguments x, y, z, . . . .

In step S18, the TFR selection unit 140 sets the amount of power resource "$Power_1$" to be used in the packet transmission to be the same as the amount of power resource "$Power_0$" available for use in the TTI, and sets the modulation scheme "$Mod_1$" to be used in the packet transmission to be the same as the modulation scheme "$Mod_2$" which is used at the initial transmission.

In step S19, in a case where the modulation scheme is set to be "QPSK", the TFR selection unit 140 calculates the amount of code resource "$Code_1$", in a manner that the coding rate becomes as close to 1/3 as possible.

Furthermore, the TFR selection unit 140 calculates "$Code_1$" in accordance with "$Code_1$=Minimum ($Code_0$, Maximum ($Code_2$, $Code_1$, 1))" in a manner that the amount of code resource "$Code_1$" becomes not less than "1", that the amount of code resource "$Code_1$" becomes not less than the amount of code resource "$Code_2$" at the time of the initial transmission, and that the amount of code resource "$Code_1$" becomes not greater than the amount of code resource "$Code_0$" available for use.

In step S20, the TFR selection unit 140 sets the amount of power resource "$Power_1$" to be used in the packet transmission to be the same as the amount of power resource "$Power_0$", which is available for use in the TTI, and sets the modulation scheme "$Mod_1$" to be used in the packet transmission to be "QPSK".

As described above, from the view point of a power resource or a code resource, in a case where the radio channel quality in the TTI is lower than the radio channel quality at the time of the initial transmission, by using the amount of power resource as much as possible for transmitting the packet, and by using the amount of code resource as much as possible until a region where the effect is present from the view point of coding, it is possible to reduce the packet error rate at the time of retransmission.

Moreover, in a case where the modulation scheme used at the time of the initial transmission has been "16QAM", and in a case where it becomes an appropriate coding rate when the amount of code resource is used to the fullest extent by setting the modulation scheme to be used in the packet transmission to be "QPSK", the modulation scheme is changed to "QPSK".

As described above, by use of "QPSK" which is a modulation scheme having a high resistance against a phasing change or a multipath interference, it becomes possible to reduce the packet error rate at the time of retransmission.

Figure 9:
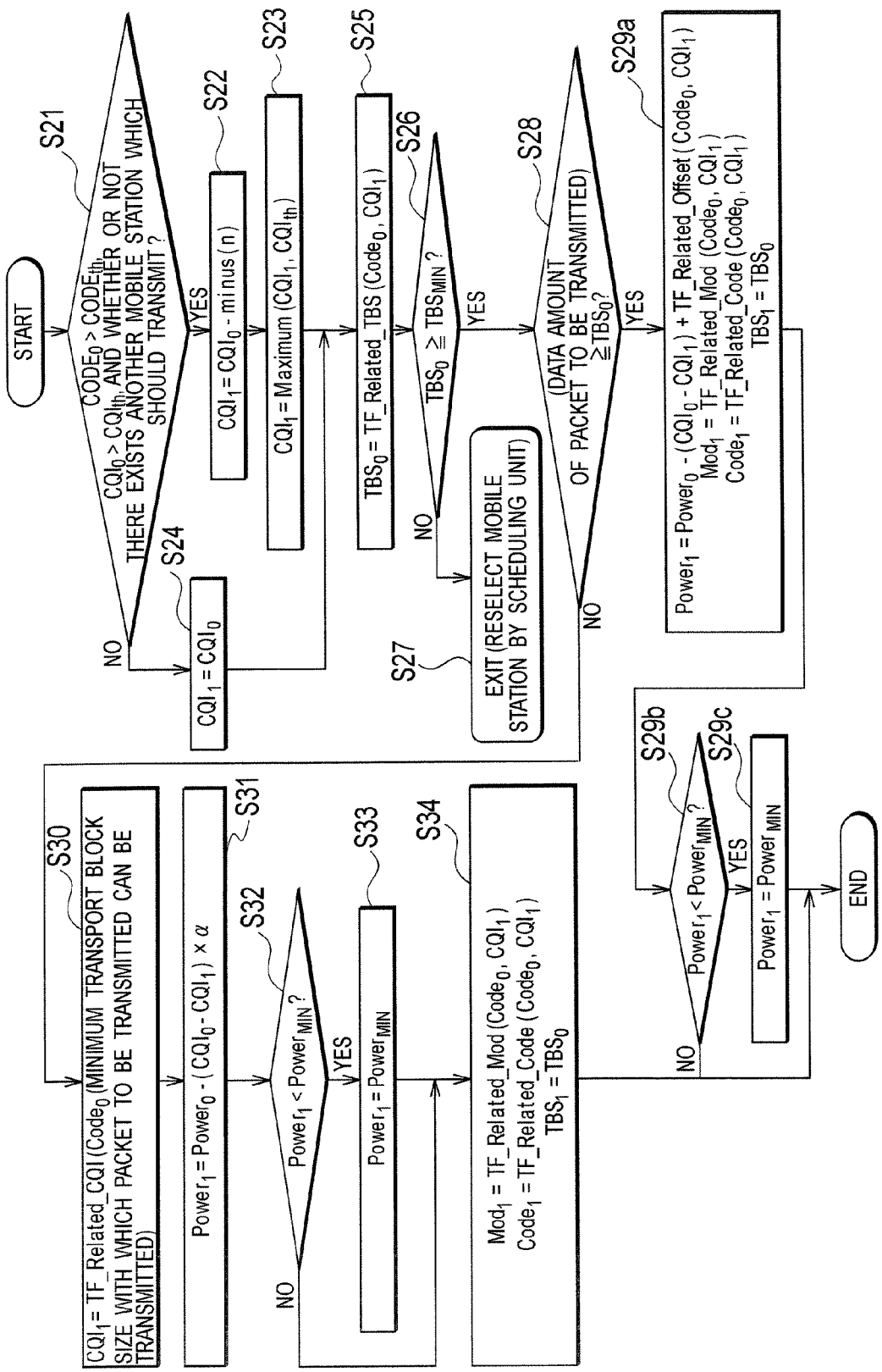
FIG. 9 is a flowchart showing an operation of re-determining a transmission method of a downlink packet in the TFR selection unit of the MAC-hs processor unit of the baseband signal processor unit of the radio base station of the mobile communications system according to the first embodiment of the present invention.

As shown in FIG. 9, in step S21, at the time of the initial transmission in an H-ARQ control, in a case where the amount of code resource "$Code_0$" available for use in the TTI is greater than the predetermined threshold value "$Code_{th}$", in a case where "$CQI_0$" which is the CQI having the amount of power resource available for use "$Power_0$" in the TTI taken into consideration is greater than the predetermined threshold value "$CQI_{th}$", and in a case where there exists another mobile station to which the packet is to be transmitted in addition to the mobile station, the operation proceeds to step S22, and in any other case, the operation proceeds to step S24.

Here, "the case where there exists another mobile station to which the packet is to be transmitted in addition to the mobile station" refers to a case where there exists a mobile station having a data queue to be transmitted, and a case where there exists an HS-SCCH which transmits control information regarding the packet transmission to such a mobile station.

In step S22, assuming that the number of mobile stations to which the packet is to be transmitted in addition to the mobile station is "n", the TFR selection unit 140 reduces the value of "$CQI_0$", in a manner that the amount of power resource available for use in the TTI is equally divided into n parts. Specifically, the TFR selection unit 140 calculates "$CQI_1=CQI_0-$minus(n)".

Here, the function minus (n) is the function that takes the number "n" of mobile stations as an argument, to which the packet is to be transmitted in addition to the mobile stations. Since the unit of CQI is "dB", for example, in a case where "n=2" is satisfied, the TFR selection unit 140 sets "minus (2)=3" for reducing the value of "$CQI_0$", in a manner that the power resource is equally divided into two parts. In a case where "n=3" is satisfied, the TFR selection unit 140 sets "minus (3)=4.7" for reducing the value of "$CQI_0$", in a manner that the power resource is equally divided into three parts. In a case where "n=4" is satisfied, the TFR selection unit 140 sets "minus (4)=6" for reducing the value of "$CQI_0$", in a manner that the power resource is equally divided into four parts.

Moreover, the TFR selection unit 140 may set "minus(x)= $10 \times \log_{10} N$".

In step S23, when the value of "$CQI_0$" is reduced in step S22, the TFR selection unit 140 causes "$CQI_1$" which is the value of CQI after the value thereof is reduced, not to be smaller than the predetermined threshold value "$CQI_{th}$".

In step S24, in a case where there does not exist a mobile station to which the packet is to be transmitted in addition to the mobile station, the TFR selection unit 140 sets "$CQI_1=CQI_0$".

By the processes from steps S21 to S24, it is made possible that, when a downlink packet is to be transmitted to a plurality of mobile stations in the TTI, the TFR selection unit 140 equally assigns an amount of power resource to the plurality of mobile stations.

In step S25, on the basis of the amount of code resource "$Code_0$" and "$CQI_1$" available for use in the TTI, the TFR selection unit 140 refers to a transmission format reference table, and then calculates a transport block size "$TBS_0$" to be used in the packet transmission in the TTI.

In step S26, in a case where "$TBS_0$" is smaller than "$TBS_{MIN}$", the operation proceeds to step S27, and in any other case, the operation proceeds to step S28.

Here, "$TBS_{MIN}$" refers to a minimum data transmission unit constituted of "(the amount of data of a single packet in an upper layer)+(the amount of data of a header)".

Note that, since the packet to be transmitted in the MAC-hs layer and the layer 1 is constituted of a packet in the upper layer and the header, any type of packet cannot be transmitted with a transport block size smaller than a value ""$TBS_{MIN}$", obtained by adding the data amount of a single packet in the upper layer and the data amount of the header.

In step S27, in a case where the transport block size "$TBS_0$" to be used in a packet transmission in the TTI is small, since even a single piece of packets in the upper layer cannot be transmitted, the TFR selection unit 140 cancels the packet transmission to the mobile station. Then, the scheduling unit 130 makes a selection of a mobile station to which a packet is to be transmitted in the TTI, again.

Here, in step S27, the scheduling unit 130 may perform the processes of assuming the amounts of power resource and code resource which are available for use in the TTI, instead of making the aforementioned selection of a mobile station again every time, then selecting "a mobile station to which even a single packet of the upper layer cannot be transmitted" in advance, and removing such a mobile station from the scheduling targets.

Furthermore, the TFR selection unit 140 may perform the processes of step S28 and the following steps, changing "$TBS_0$" to a transport block size (the minimum data transmission unit) with which only a single packet in the upper layer can be transmitted, instead that the scheduling unit 130 makes a selection of a mobile station to which the packet is to be transmitted in the TTI again.

In this case, since the packet is transmitted to the mobile station although the actual packet error rate is more deteriorated than a desired packet error rate, it is made possible to avoid an event where a packet is not transmitted at all to the mobile station.

In step S28, in a case where a data amount (the data size) of the packet to be transmitted to the mobile station in the TTI is greater than "$TBS_0$", the operation proceeds to step S29a, and in any other case, the operation proceeds to step S30.

In step S29a, on the basis of the power resource "$Power_0$" available for use in the TTI, and "$CQI_0$" and "$CQI_1$" which are calculated in steps S21 to S24, the TFR selection unit 140 refers to the transmission format reference table, and calculates the power resource "$Power_1$" to be used in the packet transmission.

Specifically, the TFR selection unit 140 calculates "$Power_1$" by using the following formula.

$$Power_1 = Power_0 - (CQI_0 - CQI_1) + TF\_Related\_Offset(Code_0, CQI_1)$$

Moreover, the TFR selection unit 140 refers to the transmission format reference table, and then calculates the modulation scheme "$Mod_1$", and the amount of code resource "$Code_1$" which are to be used in the packet transmission.

Specifically, the TFR selection unit 140 calculates "$Mod_1$" and "$Code_1$" by using the following formulae.

$$Mod_1 = TF\_Related\_Mod(Code_0, CQI_1)$$

$$Code_1 = TF\_Related\_Code(Code_0, CQI_1)$$

Furthermore, the TFR selection unit 140 sets the transport block size "$TBS_1$" to be used in the packet transmission to be "$TBS_0$".

In step S29b, in a case where "$Power_1$" is smaller than the predetermined lower limit value "$Power_{MIN}$" of the amount of power resource, the operation proceeds to step S29c, and in any other case, the operation ends.

In step S29c, the TFR selection unit 140 sets the value of "$Power_{MIN}$" to be "$Power_1$".

In step S30, on the basis of the amount of code resource "$Code_0$" available for use in the TTI, and of the minimum transport block size with which the packet to be transmitted can be transmitted, the TFR selection unit 140 refers to the transmission format reference table, and then calculates "$CQI_1$" which is the CQI corresponding to the minimum transport block size with which the data to be transmitted can be transmitted.

Specifically, the TFR selection unit 140 calculates "$CQI_1$" by using the following formula.

$$CQI_1 = TF\_Related\_CQI(Code_0, \text{the minimum transport block size with which the packet to be transmitted can be transmitted})$$

In step S31, the TFR selection unit 140 calculates the amount of power resource "$Power_1$" to be used in the packet transmission, on the basis of the amount of power resource "$Power_0$" which is available for use in the TTI, and "$CQI_0$" and "$CQI_1$".

Specifically, the TFR selection unit 140 calculates "$Power_1$" by using the following formula.

$$Power_1 = Power_0 - (CQI_0 - CQI_1) \times \alpha$$

Here, $\alpha$ is a predetermined constant number. For the sake of definition, the unit of CQI is the same as that of an amount of power resource, which is "dB", so that $\alpha$ is set to "1".

By the aforementioned process, the amount of power resource to be used in the packet transmission is reduced by the amount equal to the reduced data amount of the packet to be transmitted. Thus, the packet transmission can be performed by efficiently using the power resource, and also it is made possible to reduce the amount of interference to another cell.

In step S32, in a case where "$Power_1$" is smaller than the predetermined lower limit value "$Power_{MIN}$" of the amount of power resource, the operation proceeds to step S33, and in any other case, the operation proceeds to step S34.

In step S33, the TFR selection unit 140 sets the value of "$Power_{MIN}$" to be "$Power_1$".

In a case where the amount of power resource to be used in the packet transmission is an excessively small value in comparison with "$Power_{Default}$", there exists a case where the linearity between CQI and the amount of power resource collapses and the packet error rate thus considerably deteriorates.

For example, in step S31, in a case where "$CQI_1=2$", "$CQI_0=22$", "$Power_0=Power_{Default}=40$ dBm", and "$\alpha=1$" are satisfied, "$Power_1=20$ dBm" is satisfied. However, since the value of "$Power_1$" is too excessively small, there is a case where the packet error rate deteriorates.

Thus, by setting a predetermined lower limit value "$Power_{MIN}$" of the amount of power resource to be used in a packet transmission, and then by causing the amount of power resource to be used in the packet transmission to be not smaller than "$Power_{MIN}$", it is made possible to prevent the deterioration of the packet error rate.

For example, by setting "$Power_{MIN}=25$ dBm", it becomes possible to perform transmission in a transmission method equivalent to "$CQI_2$", with the amount of power source of "25 dBm", not "20 dBm". Thus, it is possible to prevent the deterioration of the packet error rate.

In step S34, the TFR selection unit 140 refers to the transmission format reference table, and then calculates the modulation scheme "$Mod_1$", and the amount of code resource "$Code_1$" which are to be used in the packet transmission.

Specifically, the TFR selection unit 140 calculates "$Mod_1$" and "$Code_1$" by using the following formulae.

$$Mod_1 = TF\_Related\_Mod(Code_0, CQI_1)$$

$$Code_1 = TF\_Related\_Code(Code_0, CQI_1)$$

Moreover, the TFR selection unit 140 sets the value of "$TBS_1$" to the transport block size "$TBS_1$" to be used in the packet transmission.

(Working•Effect of the Mobile Communications System According to the First Embodiment of the Present Invention)

According to the mobile communications system of the first embodiment of the present invention, a transmission method (a transmission format and a transmission resource) to be used in a packet transmission can be efficiently determined by referring to a transmission format reference table which is saved in the transmission format reference table saving unit 170 storing a transmission resource available for use in a packet transmission, downlink radio quality information, and a transmission method to be used in a packet transmission while associating them with one another, the transmission format reference table being saved in the transmission format reference table saving unit 170.

Modification Example 1

In the aforementioned first embodiment, as shown in FIGS. 6(*a*) and 6(*b*), each step width of the offset values of the amount of power resource in the transmission format reference tables is set to be 1 dB since the unit of CQI is 1 dB.

However, the present invention is not limited to the aforementioned case, and is applicable to a case where the offset values of the amount of power resource are set to values each of which is not "1 dB", but which is smaller than "1 dB", such as "0.7 dB", as shown in FIGS. 10(*a*) and 10(*b*). Specifically, in this Modification Example 1, the step widths of the offset values of power resource are set to be smaller than 1 dB in the transmission format reference tables, respectively.

According to Modification Example 1, it is made possible to set the offset values of the amounts of power resource to be appropriate values. As a result, even in a case where the power resource to be used in a packet transmission is an excessively small value in comparison with the aforementioned "$Power_{Default}$", it is possible to avoid an event where the linearity between CQI and the amount of power resource collapses, and where the packet error rate thus is considerably deteriorated.

Modification Example 2

Furthermore, for example, when the value of "$CQI_2-CQI_0$" in step S11 of FIG. 8 is large, or when the value of "$CQI_0-CQI_1$" in step S31 of FIG. 9 is large, the linearity between the CQI and the amount of power resource collapses, thereby there is a case where the power resource is excessively reduced in a case where $\alpha$ is set to "1". At this time, since the amount of power resource becomes smaller than a desired value, there exists a problem that the packet error rate deteriorates.

Accordingly, in this Modification Example 2, by setting $\alpha$ to "0.7", for example, instead of "1", it is made possible to prevent the amount of power resource to be reduced from becoming excessively large. As a result, it makes possible to prevent the packet error rate from deteriorating.

Specifically, by use of a predetermined constant number $\alpha$, it is possible to control the amount of power resource to be reduced for efficiently using transmission resources, and the degree of the deterioration of the packet error rate occurring from reducing the amount of power resource excessively.

Modification Example 3

In this Modification Example 3, in a case where a power resource included in the transmission resource available for use in a packet transmission is left, the TFR selection unit 140 adds the power resource to the amount of power resource determined as the transmission method to be used in the packet transmission.

Here, in a case where a downlink packet is to be transmitted to a plurality of mobile stations, the TFR selection unit 140 equally adds the remaining power resource to power resources. Moreover, the TFR selection unit 140 may allocate the remaining power resource to a mobile station with the highest priority in priority, not in the aforementioned "equal" manner.

According to this Modification Example 3, because of the allocation of the larger amount of power resource than that in the original case, it is expected to lower the packet error rate.

Modification Example 4

Moreover, the MAC-hs processor unit 112 may be configured of a CPU, a digital signal processor (DSP), an FPGA, or the like, which is a programmable device capable of rewriting a program. The MAC-hs processor unit 112 may include a configuration in which a program to execute the aforementioned processes is stored in a predetermined memory area, and parameters or functions ($CQI_{MAX}$, $\alpha$, $Power_{MIN}$, $CR_{MAX}$, $Code_{th}$, $CQI_{th}$, minus (n)) are rewritten by means of downloading.

At this time, the MAC-hs processor unit 112 may be configured to download the aforementioned parameters or functions from an upper node than the radio base station 100, or may be configured to read in the aforementioned parameters or functions directly from a terminal device by providing a terminal I/F (external interface function) to the TFR selection unit 140 and a TBS reselection unit 180.

Moreover, each of the function blocks of the MAC-hs processor unit 112 may be separated in hardware, or may be separated as software in programs on a processor.

Furthermore, although description is given of the HSDPA system which is a high speed packet transmission system in the 3GPP in the aforementioned embodiment, the present invention is not limited to the HSDPA system, and is applicable to a different high speed packet transmission system performing a down packet transmission control (the AMC system in particular) in a mobile communications system.

As the different high speed packet transmission system, a high speed packet transmission system or the like in the 1xEV-DO system, or the TDD system in the cdma 2000 system in the 3GPP2 can be cited as an example.

Modification Example 5

Although the transmission format reference table according to the aforementioned first embodiment associates CQI, a transport block size, an amount of code resource, a modulation scheme, and an offset value of power resource with one another, a transmission format reference table according to this Modification Example 5 is configured to retain SIR as downlink radio quality information instead of CQI.

Specifically, the transmission format reference table according to this Modification Example 5 associates SIR, a transport block size, an amount of code resource, a modulation scheme, and a power offset of power resource with one another.

Here, in the operation to determine a downlink packet transmission method in the TFR selection unit 140, the transmission format reference table retaining unit 170 converts the value of CQI into the value of SIR, by use of a predetermined calculation formula. As the calculation formula, a formula such as "SIR=CQI–4.5" is conceivable as an example.

Although the detailed descriptions have been provided so far for the present invention by citing the examples, it is clear to those skilled in the art that the present invention is not limited to the examples described in this application. A device according to the present invention can be also realized as a modification or a change of the present invention without departing from the spirit and the scope of the present invention defined by the descriptions in the scopes of claims. Accordingly, the descriptions of the present application are intended to exemplify and explain the present invention, but are not intended to impose any restriction on the present invention.

INDUSTRIAL APPLICABILITY

As has been described, according to the present invention, a packet transmission control device and a packet transmission control method, which are capable of efficiently using a transmission resource can be provided while suppressing the deterioration of a packet error rate.

Moreover, according to the present invention, it is possible to provide a packet transmission control device and a packet transmission control method, which are capable of performing a packet transmission by using a transmission resource efficiently, by determining a transmission method to be used in a downlink packet transmission on the basis of the difference between the radio channel quality at the time of a retransmission in the H-ARQ control and the radio channel quality at the time of the initial transmission, or of the data amount of a packet to be transmitted.

The invention claimed is:

1. A packet transmission control device which controls a packet transmission of a downlink to a plurality of mobile stations, the packet transmission control device comprising:

a storage unit configured to store a transmission resource available for use in the packet transmission, radio quality information on the downlink, and a transmission method to be used in the packet transmission while associating them with one another;

a determination unit configured to determine a transmission method to be used in the packet transmission on the basis of the radio quality information on the downlink reported from the mobile stations and the transmission resource available for use in the packet transmission by referring to the storage unit; and a packet transmitter configured to transmit the packet by using the determined transmission method, wherein when a data amount of packets to be transmitted is smaller than a transport block size determined as the transmission method, the determination unit is configured to reduce an amount of power resources determined as the transmission method in accordance with the following equation:

(the amount of power resources to be reduced)={(the radio quality information corresponding to the transport block size determined as the transmission method)–(radio quality information corresponding to the data amount of packets to be transmitted)}.times.(an arbitrary coefficient).

2. The packet transmission control device according to claim 1, wherein,
the storage unit is configured to store a transport block size to be used in the packet transmission as the transmission method, and
when the radio quality information on the downlink and a code resource available for use in the packet transmission are fixed, the transport block size is set so as to fulfill a predetermined packet error rate, and to become a maximum value in the storage unit.

3. The packet transmission control device according to claim 1, wherein,
the storage unit is configure to store, as the transmission method, a transport block size to be used in the packet transmission, a modulation scheme to be used in the packet transmission, an amount of code resources to be used in the packet transmission, and an amount of power resources to be used in the packet transmission.

4. The packet transmission control device according to claim 1, wherein, the arbitrary coefficient is less than 1.

5. The packet transmission control device according to claim 1, wherein,
when the amount of power resources is reduced, and when the amount of power resources to be used in the packet transmission is smaller than a predetermined lower limit value, the determination unit is configured to determine the predetermined lower limit value as the amount of power resources to be used in the packet transmission.

6. The packet transmission control device according to claim 1, wherein,
when a transport block size determined as the transmission method is smaller than a minimum data transmission unit, the determination unit is configured to cancel transmission of the packet of the downlink to the mobile station, and to transmit the packet of the downlink to another mobile station.

7. The packet transmission control device according to claim 1, wherein,
when a transport block size determined as the transmission method is smaller than a minimum data transmission unit, the determination unit is configured to determine the transmission method so that the packet can be transmitted in the minimum data transmission unit.

8. The packet transmission control device according to claim 1, wherein,
the determination unit is configured to reduce the amount of power resources determined as the transmission method for a retransmission, when the packet which has been previously transmitted is to be retransmitted, and when the determination unit judges that a current radio condition is better than a radio condition at a time when the packet has been previously transmitted, on the basis of previous radio quality information on the downlink, current radio quality information on the downlink, transmission resource available for use in the previous packet transmission, and a transmission resource available for use in a current packet transmission.

9. A packet transmission control device which controls a packet transmission of a downlink to a plurality of mobile stations, the packet transmission control device comprising:
a storage unit configured to store a transmission resource available for use in the packet transmission, radio quality information on the downlink, and a transmission method to be used in the packet transmission while associating them with one another;
a determination unit configured to determine a transmission method to be used in the packet transmission on the basis of the radio quality information on the downlink reported from the mobile stations and the transmission resource available for use in the packet transmission by referring to the storage unit; and
a packet transmitter configured to transmit the packet by using the determined transmission method, wherein,
the determination unit is configured to reduce the amount of power resources determined as the transmission method for a retransmission, when the packet which has been previously transmitted is to be retransmitted, and when the determination unit judges that a current radio condition is better than a radio condition at a time when the packet has been previously transmitted, on the basis of previous radio quality information on the downlink, current radio quality information on the downlink, the transmission resource available for use in a previous packet transmission, and a transmission resource available for use in a current packet transmission, and
the determination unit is configured to determine the amount of power resources to be reduced in accordance with the following equation:

(the amount of power resources to be reduced)={(the current radio quality information on the downlink)−(the previous radio quality information on the downlink)}.times.(an arbitrary coefficient)+ ((the power resource available for use in the current packet transmission)−(the power resource available for use in the previous packet transmission)).times.(an arbitrary coefficient).

10. The packet transmission control device according to claim 1, wherein,
the determination unit is configured to determine the transmission method for a retransmission so that the transmission resource available for use in the packet transmission can be used to its fullest extent, when the packet which has been previously transmitted is to be retransmitted, and when the determination unit judges that a current radio condition is not better than the radio condition when the packet has been previously transmitted, on the basis of previous radio quality information on the downlink, current radio quality information on the downlink, the transmission resource available for use in a previous packet transmission, and a transmission resource available for use in a current packet transmission.

11. The packet transmission control device according to claim 10, wherein,
when a modulation scheme determined as the transmission method at a time of the previous packet transmission is 16QAM, and when a coding rate becomes smaller than a predetermined value when the modulation scheme is changed to QPSK, the determination unit is configured to determine the transmission method so that the transmission resource available for use in the packet transmission can be used to the fullest extent, by changing the modulation scheme to be used in the packet transmission to QPSK.

12. The packet transmission control device according to claim 10, wherein,
the determination unit is configured to determine the transmission method so that the transmission resource available for use in the packet transmission can be used to the fullest extent, by increasing the amount of code resources to be used in the packet transmission within a range that keeps the coding rate equal to or greater than 1/3.

13. The packet transmission control device according to claim 1, wherein,
when the radio quality information on the downlink reported from the mobile station is larger than a predetermined upper limit value of the radio quality information, the determination unit is configured to determine the transmission method, by changing the radio quality information on the downlink reported from the mobile station to the predetermined upper limit value of the radio quality information.

14. The packet transmission control device according to claim 1, wherein,
when a power resource included in the transmission resource available for use in the packet transmission is left, the determination unit is configured to add the power resource to the amount of power resources determined as the transmission method to be used in the packet transmission.

15. The packet transmission control device according to claim 1, wherein,
the storage unit is configured to store, as the transmission method, an offset value of the amount of power resources to be used in the packet transmission, and a step width of the offset value of the power resource is set to less than 1 dB in the storage unit.

16. A packet transmission control method which controls a packet transmission of a downlink to a plurality of mobile stations, the method comprising:
creating a table which associates a transmission resource available for use in the packet transmission, radio quality information on the downlink, and a transmission method to be used in the packet transmission with one another;
determining a transmission method to be used in the packet transmission on the basis of the radio quality information on the downlink reported from the mobile station and the transmission resource available for use in the packet transmission by referring to the table; and
transmitting the packet by use of the determined transmission method, wherein
when a data amount of packets to be transmitted is smaller than a transport block size determined as the transmission method, determining to reduce the amount of power resources determined as the transmission method in accordance with the following equation:

(the amount of power resources to be reduced)={(the radio quality information corresponding to the transport block size determined as the transmission method)−(radio quality information corresponding to the data amount of packets to be transmitted)}.times.(an arbitrary coefficient).

17. A packet transmission control device which controls a packet transmission of a downlink to a plurality of mobile stations, the packet transmission control device comprising:
a storage unit configured to store a transmission resource available for use in the packet transmission, radio quality information on the downlink, and a transmission method to be used in the packet transmission while associating them with one another;
a determination unit configured to determine a transmission method to be used in the packet transmission on the basis of the radio quality information on the downlink reported from the mobile stations and the transmission resource available for use in the packet transmission by referring to the storage unit; and
a packet transmitter configured to transmit the packet by using the determined transmission method, wherein
when determining a transmission method of a mobile station to which the packet is transmitted, the determination unit is configured to determine the transmission method by setting N for the number of mobile stations to which the packet is transmitted in addition to the mobile station, by changing the radio quality information on the downlink to (the radio quality information on the downlink)−$10 \times \log_{10} N$, and by reducing the amount of power resources determined as the transmission method by the amount equivalent to $10 \times \log_{10} N$.

18. The packet transmission control device according to claim 9, wherein, the arbitrary coefficient is less than 1.

19. A packet transmission control device which controls a packet transmission of a downlink to a plurality of mobile stations, the packet transmission control device comprising:
a storage unit configured to store a transmission resource available for use in the packet transmission, radio quality information on the downlink, and a transmission method to be used in the packet transmission while associating them with one another;
a determination unit configured to determine a transmission method to be used in the packet transmission on the basis of the radio quality information on the downlink reported from the mobile stations and the transmission resource available for use in the packet transmission by referring to the storage unit; and
a packet transmitter configured to transmit the packet by using the determined transmission method, wherein,
the determination unit is configured to reduce the amount of power resources determined as the transmission method for a retransmission, when the packet which has been previously transmitted is to be retransmitted, and when the determination unit judges that a current radio condition is better than a radio condition at a time when the packet has been previously transmitted, on the basis of previous radio quality information on the downlink, current radio quality information on the downlink, the transmission resource available for use in the previous packet transmission, and a transmission resource available for use in a current packet transmission, and
when the amount of power resources is reduced, and when the amount of power resources to be used in the packet transmission is smaller than a predetermined lower limit value, the determination unit is configured to determine the predetermined lower limit value as the amount of power resources to be used in the packet transmission.

20. The method according to claim 16, wherein
the determining the transmission method includes, for a retransmission, ensuring that the transmission resource available for use in the packet transmission can be used to its fullest extent, when the packet which has been previously transmitted is to be retransmitted, and when the determination unit judges that the current radio condition is not better than the radio condition when the packet has been previously transmitted, on the basis of previous radio quality information on the downlink, current radio quality information on the downlink, the transmission resource available for use in the previous packet transmission, and a transmission resource available for use in a current packet transmission.

21. The packet transmission control device according to claim 1, wherein,
the determination unit is configured to determine the transmission method, so that the transmission resource available for use in the packet transmission can be equally allocated to the plurality of mobile stations at a single transmission timing.

* * * * *